United States Patent
Moriwaki

(10) Patent No.: US 7,136,341 B2
(45) Date of Patent: Nov. 14, 2006

(54) INFORMATION RECORD AND PLAYBACK APPARATUS

(75) Inventor: Isamu Moriwaki, Toyonaka (JP)

(73) Assignee: Ricoh Company, Ltd., Tokyo (JP)

( * ) Notice: Subject to any disclaimer, the term of this patent is extended or adjusted under 35 U.S.C. 154(b) by 274 days.

(21) Appl. No.: 10/460,551

(22) Filed: Jun. 12, 2003

(65) Prior Publication Data

US 2004/0037199 A1 Feb. 26, 2004

Related U.S. Application Data

(62) Division of application No. 09/735,982, filed on Dec. 13, 2000, now Pat. No. 6,594,215.

(30) Foreign Application Priority Data

Dec. 13, 1999 (JP) ................................. 11-352883

(51) Int. Cl.
 *G11B 7/00* (2006.01)
(52) U.S. Cl. .................................... 369/53.35
(58) Field of Classification Search ............ 369/53.31, 369/53.35, 53.36, 47.27, 47.28, 47.21, 47.22, 369/47.18, 59.23, 59.24, 124.04, 124.06, 369/124.07, 124.15
See application file for complete search history.

(56) References Cited

U.S. PATENT DOCUMENTS

| | | | |
|---|---|---|---|
| 5,953,297 A | 9/1999 | Maeda et al. | |
| 6,028,828 A | 2/2000 | Maeda | |
| 6,061,313 A | 5/2000 | Shigemori | |
| 6,144,625 A | 11/2000 | Kuroda et al. | |
| 6,272,089 B1 | 8/2001 | Kato | |
| 6,522,608 B1 | 2/2003 | Kuroda | |
| 6,594,215 B1 * | 7/2003 | Moriwaki | 369/53.35 |
| 6,757,231 B1 * | 6/2004 | Fujiwara | 369/53.35 |

* cited by examiner

*Primary Examiner*—Thang V. Tran
(74) *Attorney, Agent, or Firm*—Cooper & Dunham LLP

(57) ABSTRACT

An information record and playback apparatus configured to perform record and playback operations of an optical disk which is provided with data recording tracks having a surface wobbled at a predetermined frequency and a plurality of prepits formed with a predetermined phase relation to the position for data recording. The apparatus includes at least a demodulation circuit which operates for a predetermined error flag be indicated at the position of the assumed LPP data bit, when the error pattern is detected to be other than '1' or '0', that may be caused, for example, by noise. Erasure correction with the Reed-Solomon code therefore becomes feasible using the error flag. This achieves error correction of a number of errors even using fewer added data, thereby offering advantages in increasing efficiency in the error correction.

9 Claims, 20 Drawing Sheets

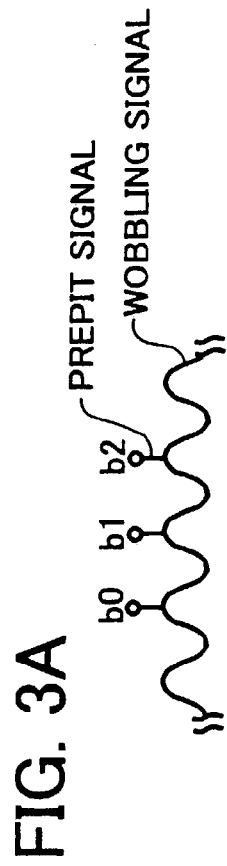
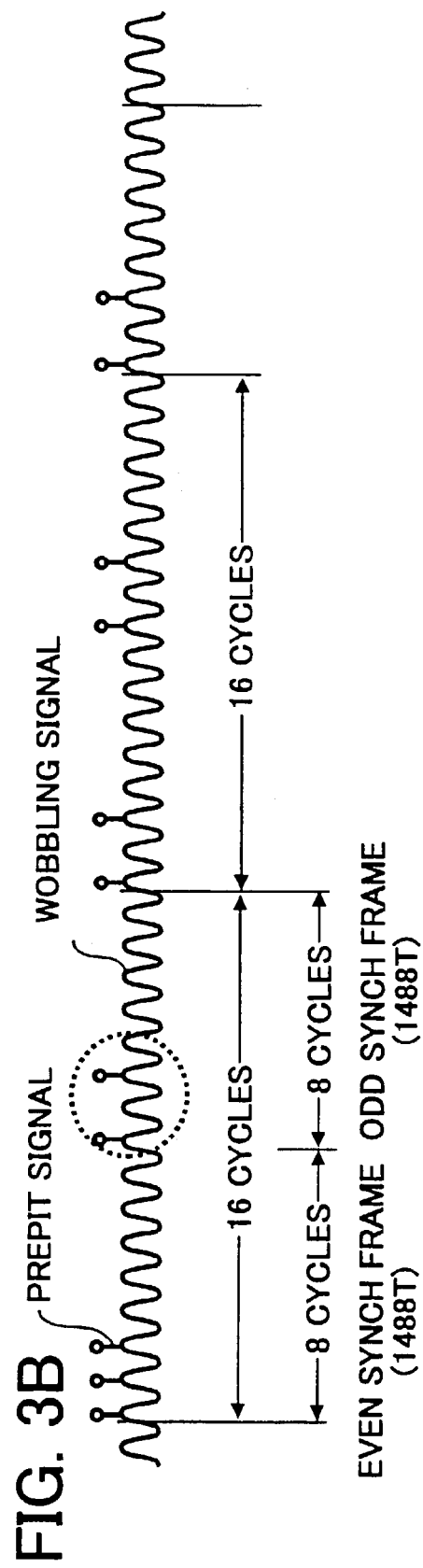
FIG. 3A
FIG. 3B

FIG. 5

| BIT DESIGNATION | b0 | b1 | b2 |
|---|---|---|---|
| SYNCH BIT (ALWAYS 1) | 1 | * | * |
| START EVEN SYNCH FRAME | 1 | 1 | 1 |
| START ODD SYNCH FRAME | 1 | 1 | 0 |
| DATA 1 | 1 | 0 | 1 |
| DATA 0 | 1 | 0 | 0 |

FIG. 10

| INPUT | | | | | | OUTPUT | | | |
|---|---|---|---|---|---|---|---|---|---|
| R0 | R1 | R2 | R3 | R4 | | WORD SYNCH DATA | BIT SYNCH DATA | LPP DATA BIT | BIT ERROR DATA |
| 1 | 1 | 1 | 0 | 0 | | H | L | X | X |
| 0 | 1 | 1 | 0 | 0 | | H | L | X | X |
| 1 | 0 | 1 | 0 | 0 | | L | H | H | L |
| 0 | 0 | 1 | 0 | 0 | | L | H | L | L |
| 1 | 0 | 0 | 1 | 0 | | L | H | H | H |
| 0 | 0 | 0 | 1 | 0 | | L | H | L | H |
| (OTHER COMBINATION) | | | | | | | | | |

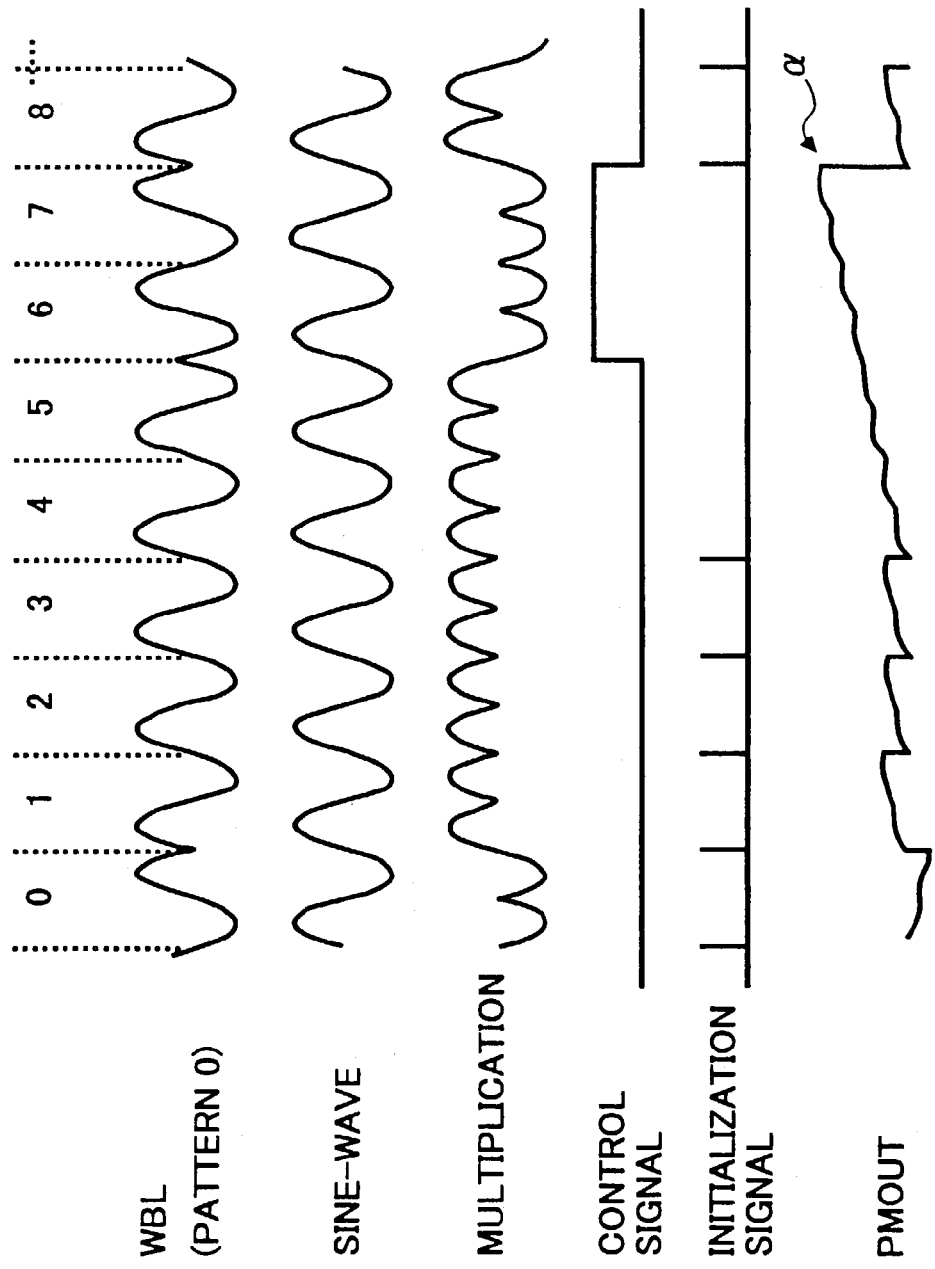

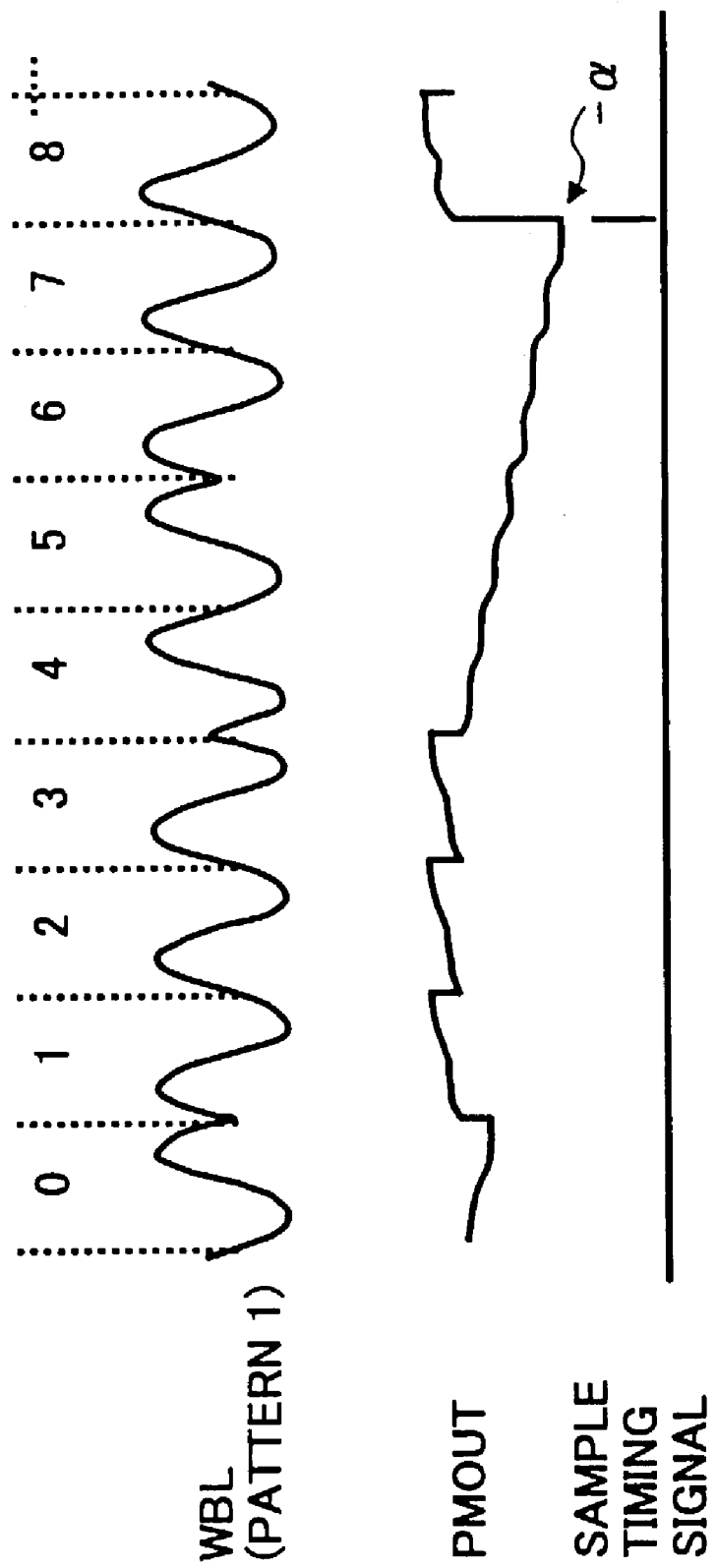

INFORMATION RECORD AND PLAYBACK APPARATUS

This application is a DIV of Ser. No. 09/735,982 Dec. 13, 2000 U.S. Pat. No. 6,594,215.

BACKGROUND

1. Field

This patent specification relates to an information record and playback apparatus in use for information recording media such as optical disks, magneto-optical disks and other similar media, and more particularly, to a demodulation circuit in such apparatus configured to carry out address demodulation.

2. Discussion of the Background

In data recording media such as optical disks, for example, it has been known to provide data prefabricated on the disk and include address information utilized for specifying the position for recording data, and information such as synchronization signals and wobbling signals for controlling the disk rotation, and other similar data.

As optical recording media capable of additionally writing (or recording) information data on the basis of these pre-data, also known previously are CD-recordable (CD-R) disks which have the approximately same storage capacity as compact disks (CDs).

The pre-data are in general prepared by forming in advance recording tracks such as grooves and lands for recording information data, in which the pre-data to be recorded are first frequency modulated (FM) to obtains FM signals. Subsequently, the pre-data to be recorded are incorporated into the disk by forming recording tracks to have a wobbling surface with the wobbling frequency corresponding to the FM signal frequency.

In order to additionally record information data into the CD-R disks, a playback apparatus detects wobbling signals from the wobbling pattern on the disk to obtain a wobbling frequency, then extracts standard clock signals for controlling the disk rotation on the basis of the wobbling frequency. In addition, the apparatus generates necessary drive signals for controlling the rotation of a spindle motor in use for the CD-R disk rotation, then generates recording clock signals including timing signals in synchronous with the CD-R disk rotation.

Also in the CD-R disks, address information on the disks needed for information data recording is obtained by first playing back the pre-data during the data recording and subsequently detecting the position to record on the basis of the pre-data, to thereby be able to achieve the recording.

High density recording media have also been put into practical use recently, such as digital video disks or digital versatile disks (DVDs), which has an increased storage capacity over the previous CDs.

Among the higher density storage media exemplified by the DVDs, information data tracks (e.g., grooved tracks) are formed, having the aforementioned wobbling surface on the basis of the frequency corresponding to standard clock signals. This method is used in optical recording media such as write once type DVD recordable (DVD-R) and DVD Rewritable (DVD+RW) media.

Regarding error correction for the pre-data recorded into the DVD-R and DVD+RW disks, it is necessary to add a plurality of data to be utilized in the error correction, since the position and pattern of an error have to be computed. The error correction data are typically exemplified by the Reed-Solomon code which has been in use for not only DVD disks but also CDs and digital audio tapes (DATs).

As the data to be added for the error correction using the Reed-Solomon code, parity words consisting of at least 2t words are necessary for correcting an error of t words.

For example, for land prepit data (which is hereinafter referred to as 'LPP'), a parity word consisting of three words is added to an address information data of three words, and one one-word error in the address information can be corrected. In contrast, for the case of address data in pre-groove (which is hereinafter referred to as 'ADIP'), a five-words parity word is added to an eight-words address multiplex (MUX) information data, and one two-words error in the address MUX information can be corrected.

As described above, in error correction steps for the address data played back from the DVD type disks, there have previously persisted drawbacks such as low efficiency in the error correction, for example, in which the number of words which is successfully corrected is relatively small compared with the number of added parity words.

SUMMARY

Accordingly, it is an object of the present disclosure to provide an information record and playback apparatus, having most, if not all, of the advantages and features of similar employed apparatuses, while eliminating many of the aforementioned disadvantages.

It is another object of the present disclosure to provide an information record and playback apparatus which is capable of achieving improved efficiency in error correction for DVD type optical disks.

The following brief description is a synopsis of only selected features and attributes of the present disclosure. A more complete description thereof is found below in the section entitled "Description of the Preferred Embodiments"

An information record and playback apparatus disclosed herein is configured to perform record and playback operations of an optical disk which is provided with data recording tracks having the surface wobbled at a predetermined frequency and a plurality of prepits formed on the surface with a predetermined phase relation to the position for data recording.

The apparatus includes a preset signal generation unit configured to detect the prepits, and generate and output prepit signals; a data decoding circuit configured to decode the prepit signals, and extract decoded information data; a data error detection unit configured to compare the pattern of information data to that of a predetermined data, and output the decoded information data added with a predetermined error flag, if both of the patterns are not in coincidence each other; and a data error correction unit configured to compute the position of an error on the basis of the error flag and provide error correction to the decoded information data.

The data error correction unit is configured to carry out erasure correction with the Reed-Solomon code prior to error correction of the decoded information data. In addition, the data error correction unit carries out the detection of the position of, and the correction of, error data bits using only data bits demodulated by the data demodulation unit if a number of error flags that is added by the data error detection unit exceeds a predetermined number.

In another aspect disclosed herein, an information record and playback apparatus is configured to perform record and playback operations of an optical disk which is provided with data recording tracks having the surface wobbled so as to be capable of indicating information data by phase inversion according to the dual phase modulation method.

The apparatus includes a wobbling signal generation unit configured to detect wobbling components previously recorded on the data recording track and generate wobbling signals; a data decoding unit configured to phase-demodulate the wobbling signals and extract decoded information data; a data error detection unit configured to integrate the decoded information data for each pattern of the data, compare a data pattern of the decoded information data with a predetermined value to obtain a comparison result, detect an error for the data pattern on the basis of the comparison result, and output the data pattern added with a predetermined error flag; and a data error correction unit configured to compute the position of the error on the basis of an error flag to subsequently provide error correction to the decoded information data.

The data error correction unit is configured to carry out inversion processing of the decoded information data when the decoded information data form a predetermined data pattern, such that the integration value of data pattern reaches either a maximum value or a minimum value, and output the data pattern added with a predetermined error flag if a resultant integration value of the data pattern is obtained between the maximum and minimum values.

In addition, the data error correction unit is configured to carry out erasure correction with the Reed-Solomon code prior to error correction of the decoded information data. Further, the data error correction unit is configured to carry out the detection of the position of, and the correction of error data bits using only data bits demodulated by the data demodulation unit if a number of error flags that is added by the data error detection unit exceeds a predetermined number.

BRIEF DESCRIPTION OF THE DRAWINGS

FIG. 3A is a diagram illustrating the portions related to prepit signals in the format for recording pre-data and disk rotation control signals;

FIG. 3B is a diagrams illustrating the entire portion of the format for recording pre-data and disk rotation control signals;

FIG. 5 contains the table illustrating the results obtained by decoding prepit signals;

FIG. 10 contains the table illustrating truth values in the pattern detector of FIG. 9;

FIGS. 16A and 16B include timing charts illustrating the waveform generated in respective parts of the PM demodulation circuit of FIG. 15;

DESCRIPTION OF THE PREFERRED EMBODIMENTS

In the detailed description which follows, specific embodiments of the apparatus and method are described, which are particularly useful for record and playback in use for information data using optical disks. It is understood, however, that the present disclosure is not limited to these embodiments. For example, the modulation and demodulation apparatus disclosed herein may also be adaptable to any form of information recording and playing back. Other embodiments will be apparent to those skilled in the art upon reading the following description.

Figure 1:
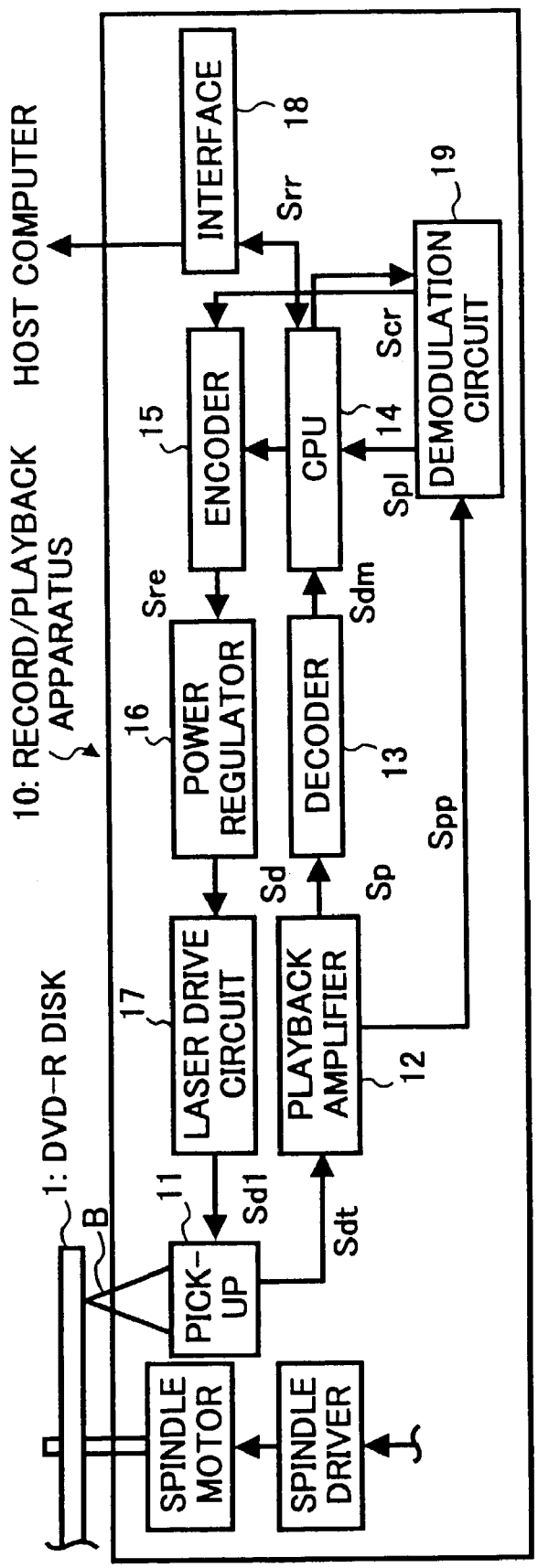
FIG. 1 is a block diagram illustrating an information record and play back apparatus according to one embodiment disclosed herein.

FIG. 1 is a block diagram illustrating an information record and playback apparatus according to one embodiment disclosed herein.

Referring to FIG. 1, the record and playback apparatus 10 includes at least one microcomputer provided with CPU, ROM, RAM and other similar devices, which is configured to be capable of detecting prepit signals that are utilized in recording digital information data transmitted from a host computer into a DVD-R disk 1 which serves as a data recording medium. The term 'prepits' refers herein to the pits prefabricated on the disk in order to achieve several purposes detailed herein below such as, for example, controlling the disk rotation.

In addition to the prepits pertaining address information, prefabricated in the DVD-R disk 1 are grooved tracks having a wobbling surface. In the record and playback apparatus 10, recording digital information data into a DVD-R disk 1 is carried out into the recording position which is specified by an address signal on the basis of prepits obtained during recording steps.

Figure 2:
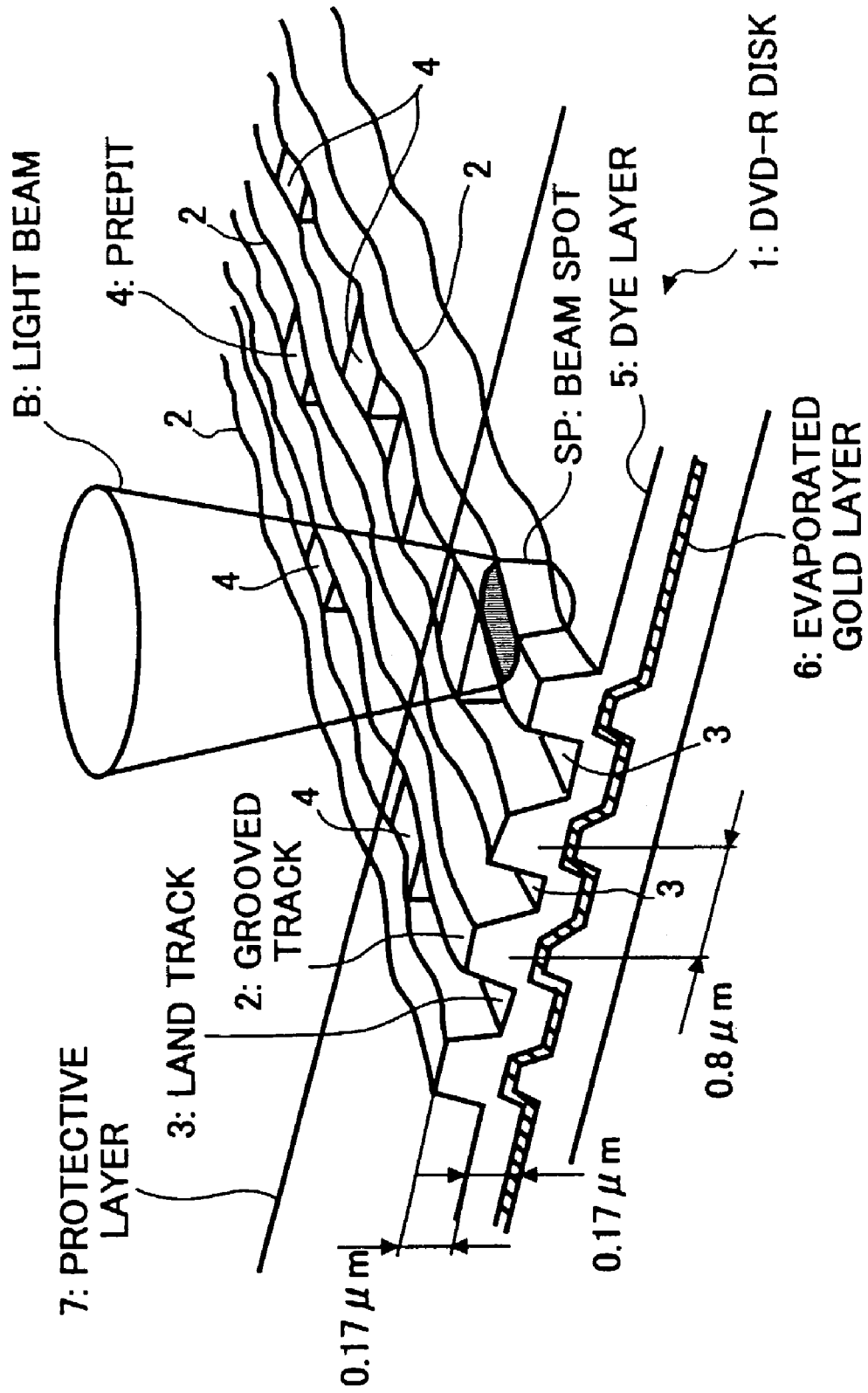
FIG. 2 is a perspective view illustrating the structure of the DVD-R disk of FIG. 1.

Referring to FIG. 2, the structure of the DVD-R disk 1 will be described.

The DVD-R disk 1 disclosed herein is a dye-coated write-once type optical recording disk provided with a dye layer 5. This disk is further provided with grooved tracks 2 which serve as data tracks, and land tracks 3 which are adjacent to the grooved tracks 2 and utilized for guiding a light beam B. The light beam B such as, for example, a laser beam is utilized in recording and playing back information data.

A plurality of the prepits 4 are provided on the land tracks 3 corresponding to preset information data (which is hereinafter referred to as 'pre-data') and they are prefabricated during optical disk formation. In addition, the DVD-R disk 1 is further provided with an evaporated layer of metal 6 to reflect the light beam B during the playback steps of recorded information data, and a protective layer 7 to serve for protecting the grooved track 2, land track 3, prepits 4, and dye layer 5.

Along with the thus described construction, the record and playback apparatus 10 is configured to record into DVD-R disk 1 several information data to be recorded presently such as image data in addition to the above described pre-data and control data for the disk rotation.

Namely, the apparatus 10 operates to control the velocity of rotation of DVD-R disk 1 so as to be at predetermined values with respect to the frequencies obtained from the wobbling of the grooved track 2, and to acquire preset disk drive data detected from the detected prepits 4.

Based on the data obtained from the detected prepits 4, the apparatus 10 also operates to adjust the light beam B to have optimum output intensities and acquire addressing information regarding the address of the position on the disk to subsequently carry out data recording into the proper position determined for the present recording.

During data recording with the record and playback apparatus 10, the data recording is achieved by forming each information data bits by irradiating the light beam B such that the center of the beam is coincident with that of the grooved track 2. In addition, the size SP of the beam spot is adjusted during the irradiation so as to cover portions of the neighboring land tracks 3 as well as the grooved track 2.

The acquisition of the pre-data by the record and playback apparatus 10 is carried out through detecting the prepits 4 using a portion of the reflected light from the beam spot SP irradiated on the land tracks 3 by either the push-pull method or a modified push-pull method. The latter utilizes a split light detector divided along the line running parallel to the direction of the DVD-R disk rotation, which is hereinafter referred to as 'radial push-pull method'.

At the same instance, the record and playback apparatus 10 also detects wobbling signals from the grooved track 2 to subsequently acquire clock signals for controlling the disk rotation.

Referring now to FIGS. 3A and 3B, formats for recording the pre-data and disk rotation control signals will be detailed. Among the signals played back from recorded information data, the portion related to the prepit signals are shown in FIG. 3A, while the entire portion of these signals are shown in FIG. 3B.

As illustrated in FIGS. 3A and 3B, the wave pattern of the wobbling signals is formed as the reflection of wobbling pattern prefabricated on the grooved track 2. Also, information data recorded on the DVD-R disk 1 are formed being subdivided beforehand into synch frame units, each of which serves as a data recording unit. One recording sector has twenty-six synch frames and sixteen recording sectors form one error correcting code (EeC). Incidentally, each synch frame has a length of 1488T, with the parameter T being the unit which is defined on the basis of the bit interval dictated in the recording format utilized in data recording.

The groove track 2 is provided with the wobbling pattern which is formed over respective synch frames with a constant wobbling frequency f0 of 141 kHz (where one synch frame corresponds to eight wobbling periods). By detecting the thus provided constant wobbling frequency f0, the apparatus 10 acquires necessary signals for controlling the rotation of a spindle motor.

In contrast, the aforementioned pre-data on the DVD-R disk 1 are recorded for every synch frame. In recording the pre-data by means of prepits 4, one of them is always formed as a synchronization signal in the portion of the land track 3 adjacent to the region into which the synchronization signal for each synch frame is to be recorded.

At the same time, additional one or two prepits 4 are formed as the signals indicative of pre-data (such as address data) into the portion of the land track 3 adjacent to the region which precedes the above portion for the synchronization signal for each synch frame to be recorded.

It is noted that, in some instances, none of the pre-bits 4 may be formed in the preceding portion of the synch frame depending on the content of the present pre-data. Also, in a certain recording sector, the pre-data may be recorded with prepits 4 formed only in either even-numbered or odd-numbered synch frame, which are hereinafter referred to as EVEN- or ODD-frame, respectively.

Played back signals from the thus formed prepits 4 are superimposed on wobbling signals, as illustrated in FIGS. 3A and 3B, and prepit signals generally appear in EVEN synch frames. When a plurality of the prepits 4 are formed adjacent to each other, a cross talk may result among the prepit signals. In such a case, prepits 4 may be formed in an ODD-frame for proper prepit signals to be obtained, as shown with a dotted circle in FIG. 3B. To the contrary, prepits 4 may be transferred from an ODD-frame to EVEN-frame in some other cases.

In addition, as shown in FIG. 3A, prepit signals appear at three positions b0, b1 and b2 among the first eight cycles of the wobbling signal.

The features of the prepit signals b0, b1 and b2 will be detailed herein below, referring to FIG. 4, in which triangles and squares indicate the positions where prepit signals appear for the ODD and EVEN synch frames, respectively.

Figure 4:
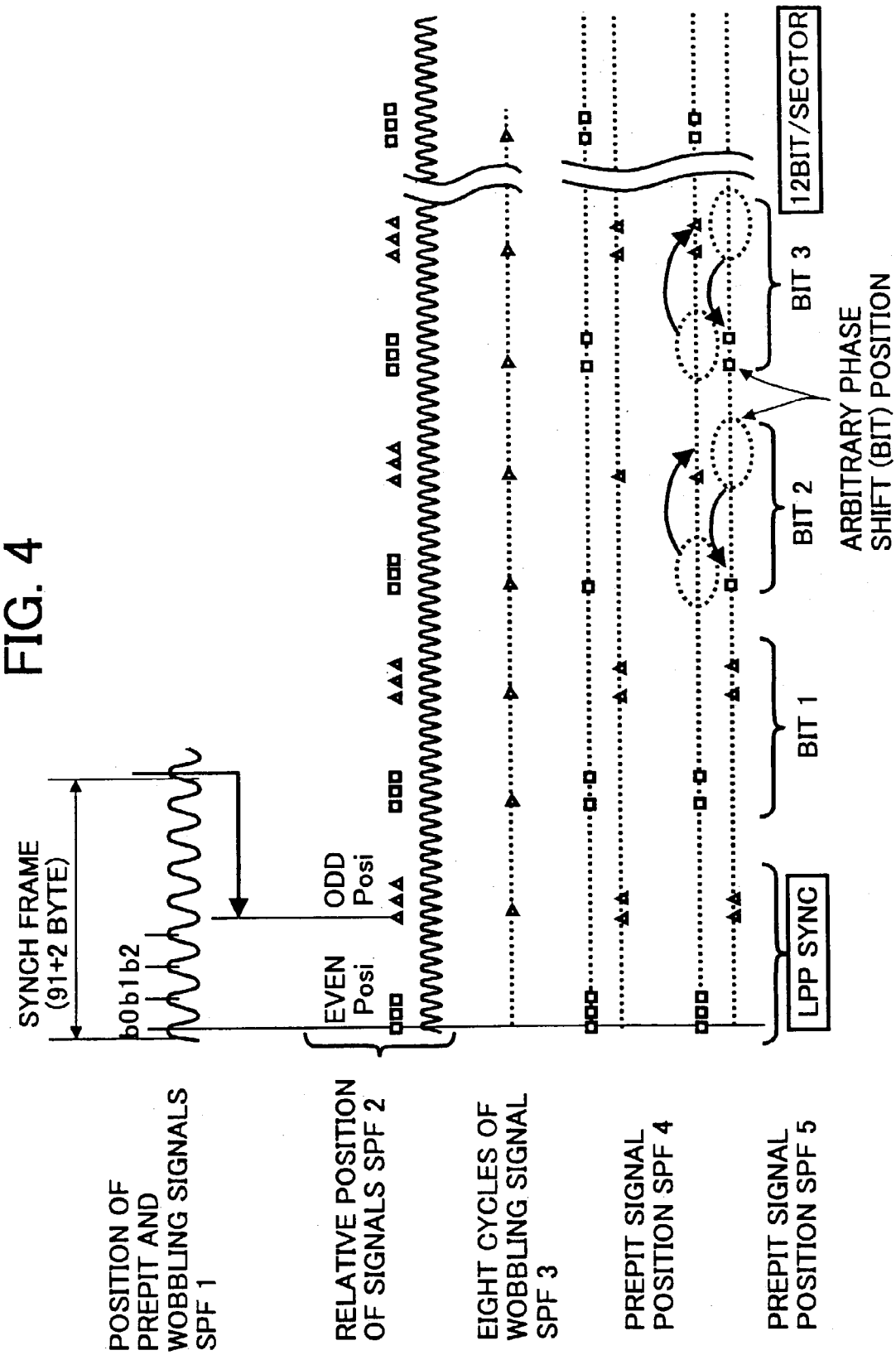
FIG. 4 includes charts illustrating the position of prepit signals with respect to wobbling signals disclosed herein.

There shown respectively from the top in FIG. 4 are the position and form of wobbling and prepit signals (signal position and form 1, or SPF 1), prepit signals with respect to the wobbling signals (SPF 2), marks dividing each of eight cycles of the wobbling (SPF 3), prepit signals appearing in case without signal transfer between EVEN and ODD synch frames (SPF 4), and with the signal transfer (SPF 5).

As illustrated by SPFs 2 and 3 in FIG. 4, prepit signals in each synch frame appear in the first three, but not the following five, positions among the first eight cycles of the wobbling signal. Also, as illustrated by SPFs 4 and 5 in FIG. 4, the prepit signal at b0 appears in each synch frame. Therefore, this prepit signal is formed to represent always the value '1' and serve as a synch bit to be used in synchronization of detected prepit signals.

In addition, the prepit signal at the position b1 appears only in the first synch frame and the value of this signal is always '1'. When no prepit signal appears at b1, the prepit signal at the next b2 is regarded as to represent address data. In contrast, when a prepit signal appears at b1, the prepit signal at b2 serves to distinguish between EVEN and ODD synch frames.

Namely, as illustrated by SPFs 4 and 5 in FIG. 4, when prepits appear at both b1 and b2, they are regarded as being in the first frame of the EVEN synch frame. In contrast, when a prepit appears at b1 with no prepit at b2, it is regarded as being in the first frame of the ODD synch frame.

In addition, when no prepit signal appears at b1, the value for data are indicated by the next prepit signal, in which the values are set to be '1' and '0' for the cases with and without prepit signal at b2, respectively. For example, there are shown by SPFs 4 and 5 in FIG. 4, that the data of BIT 1 and BIT 2 are '1' and '0', respectively.

Therefore, each sector consists of one leading synch frame (which is indicated as 'LPP synch' in SPF 5 of FIG. 4 and a plurality of BIT 1 through BIT 12, which serve as data synch frames. Several information data such as SYNCH information and data information may be obtained through decoding prepit signals, and the results from decoding prepit signals are illustrated in the table included in FIG. 5.

Referring again to FIG. 1, there detailed is the construction of the information record and playback apparatus 10 disclosed herein.

Digital information $S_{rr}$ to be recorded is input from an external host computer into the record and playback apparatus 10 by way of an interface 18.

A pickup unit 11 includes a laser diode, deflecting light beam splitter, objective lens and photo-detector. The pickup unit 11 operates the laser beam B be irradiated onto a recording layer of the DVD-R disk 1. A portion of the laser beam B is reflected from the recording layer and subsequently utilized in detecting signals from prepits 4 and wobbling pattern on the grooved tracks 2 by means of the aforementioned radial push-pull method.

With thus obtained signals, the recording of the digital information $S_{rr}$ can be achieved. In addition, when any digital information recorded previously is found, the pickup unit 11 detects the information using the laser beam B.

A playback amplifier 12, which is also included in the apparatus 10, serves to-amplify several signals such as prepits 4 output from the pickup unit 11, and detected signals Sdt, which contain information data corresponding to wobbling signals from the grooved tracks 2.

The playback amplifier 12 then outputs pre-information signals Spp corresponding to the prepits signals and wobbling signals, together with amplification signals Sp corresponding to the previously recorded digital information.

A decoder 13 serves to decode the amplification signals Sp through the application of the eight-sixteen demodulation and interleave processing steps, and subsequently output demodulated signals Sdm to a CPU 14.

Under the control of the CPU 14, an interface 18 carries out, interfacing process steps for the digital information Srr, which is transferred from the host computer to be input into the record and playback apparatus 10. The interface 18 subsequently outputs the above interfaced digital information Srr to an encoder 15 by way of the CPU 14.

The encoder 15 carries out several processing steps such as error-correcting code (ECC) generation, eight-sixteen demodulation and scrambling, to subsequently generate modulated signals $S_{re}$ to be output to a power control circuit 16.

The power control circuit 16 carries out waveform transformation of the modulated signals $S_{re}$ to improve the shape of recorded bits to be formed on the DVD-R disk 1, that is so called right strategy processing. Resultant signals are output as recording signals Sd to be used for driving a laser diode in the pickup 11.

Based on the thus prepared recording signals Sd, a laser driving circuit 17 operates to output laser driving signals Sd1 for actually carrying out the driving the laser diode and emitting the laser beam B.

On the other hand, a demodulation circuit 19 serves to demodulate the pre-data signals $S_{pp}$ fed from the playback amplifier 12 to subsequently obtain pre-data decoded signals Spj. The pre-data decoded signals Spj are then output to the CPU 14.

Based on the pre-data decoded signals Spj output by the demodulation circuit 19, the Cpu 14 acquires pre-data and serves to control digital information $S_{rr}$ to be recorded at proper positions on the DVD-R disk 1 corresponding to address data contained in the pre-data decoded signals Spj.

At the same time, on the basis of the demodulated signals Sdm, the CPU 14 outputs played back signals corresponding to the previously recorded digital information by way of the interface 18 toward the exterior of the apparatus 10, and also assumes overall control of the record and playback apparatus 10.

Incidentally, the aforementioned rotation control signals for the DVD-R disk 1 are supplied to the spindle motor via a spindle driver.

Figure 6:
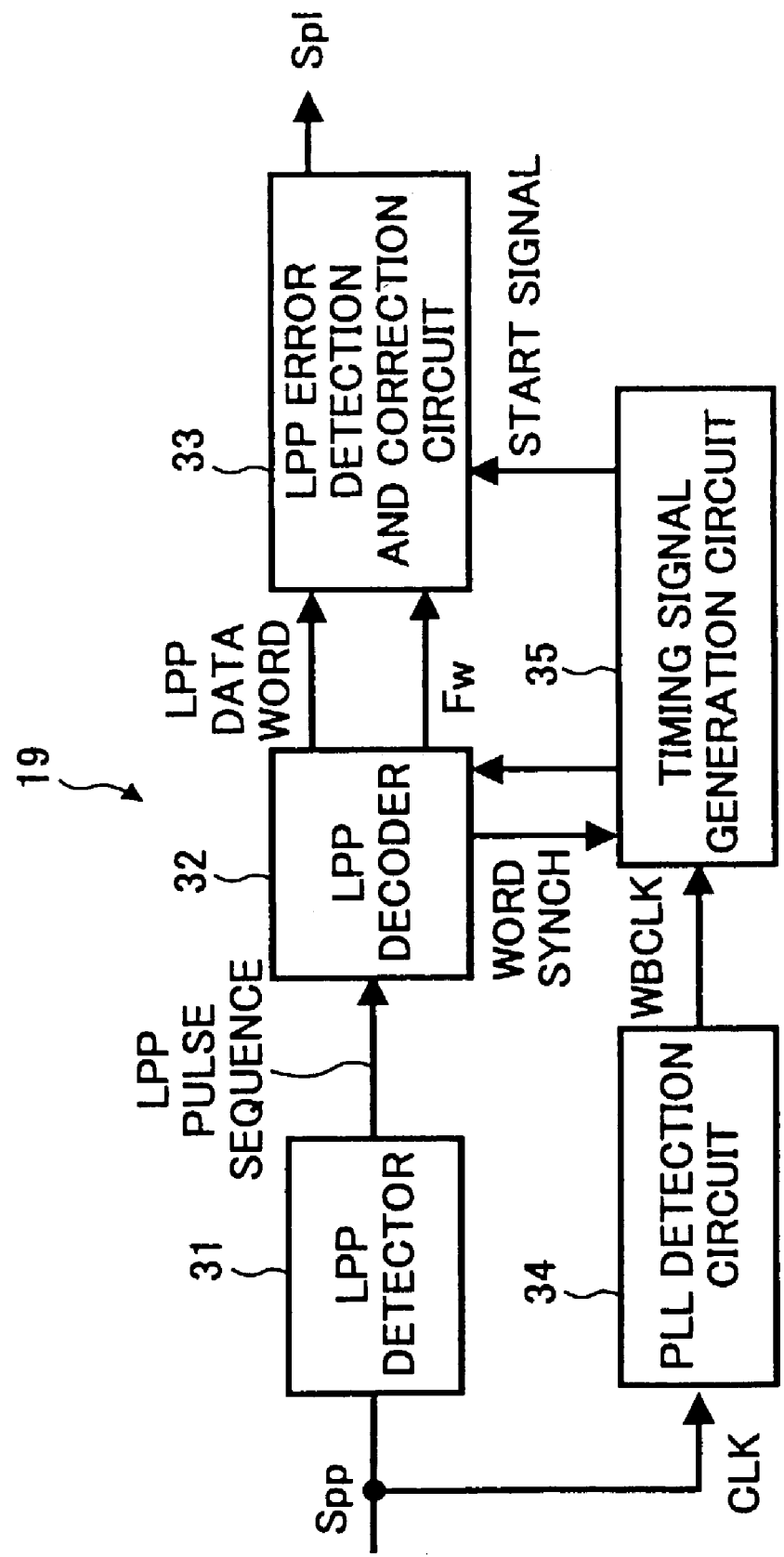
FIG. 6 is a block diagram of the major parts of the demodulation circuit 19 of FIG. 1.

FIG. 6 is a block diagram of the major parts of the demodulation circuit 19 of FIG. 1.

Referring to FIG. 6, the demodulation circuit 19 includes an LPP detector 31, LPP decoder 32, LPP error detection and correction circuit 33, phase-locked loop (PLL) circuit 34, and timing signal generation circuit 35.

Into the LPP detector 31 and PLL circuit 34, pre-data signals $S_{pp}$ are input from the playback amplifier 12. In addition, the PLL detection circuit 34 is supplied with clock signals CLK from the exterior of the apparatus 10, then extracts another set of clock signals WBCLK which are in synchronous with one cycle of the wobbling signal, and subsequently output the clock signals WBCLK to the timing signal generation circuit 35.

On the basis of the input clock signals WBCLK, the timing signal generation circuit 35 generates and then outputs predetermined control signals to be fed to the LPP decoder 32 and LPP error detection and correction circuit 33.

The LPP detector 31 detects LPP pulses from the input pre-data signals $S_{pp}$ to output to the LPP decoder 32.

The LPP decoder 32 detects the pattern of the LPP pulse series output by the LPP detector 31, generates LPP data bits and error flags F, both of which are to be latched serially with time by a shift register, and outputs the LPP data words and error flags Fw corresponding thereto.

The LPP error detection and correction circuit 33 carries out erasure correction of the Reed-Solomon codes using the LPP data words and error flags Fw output from LPP decoder 32, and output resultant pre-data decoded signals $S_{pj}$.

Figure 7:
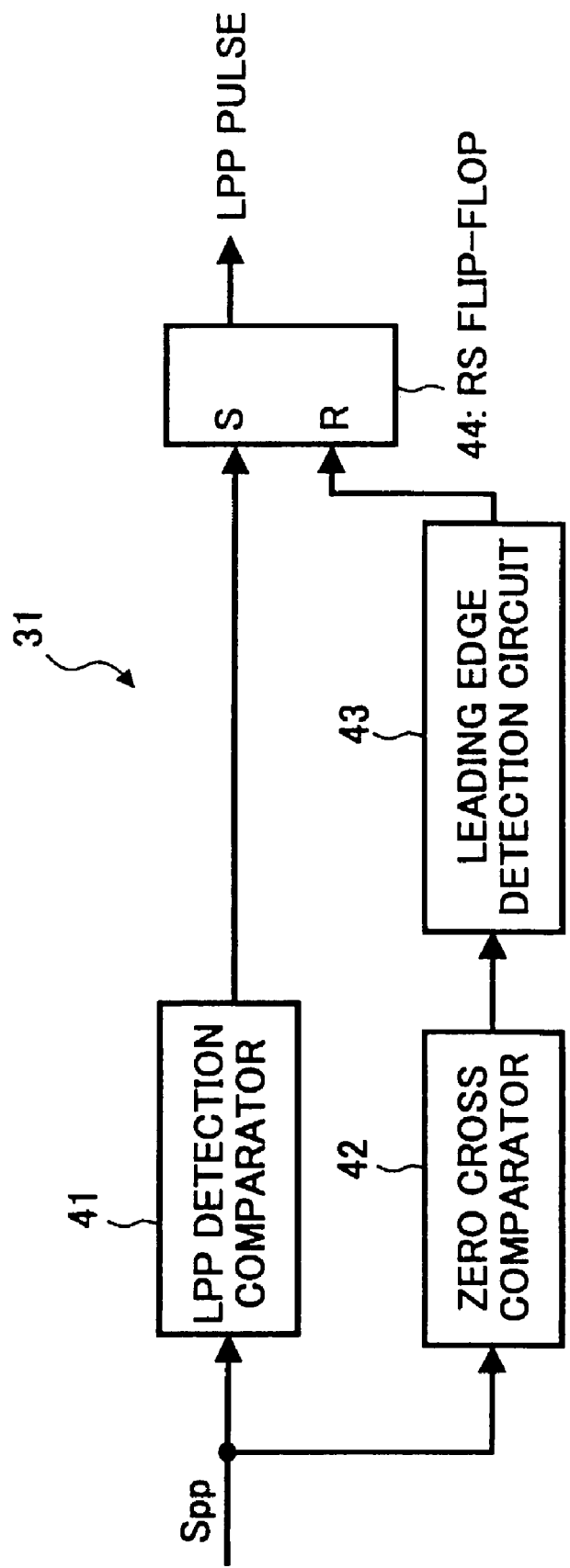
FIG. 7 is a block diagram of the major parts of the LPP detector of FIG. 6.
Figure 8:
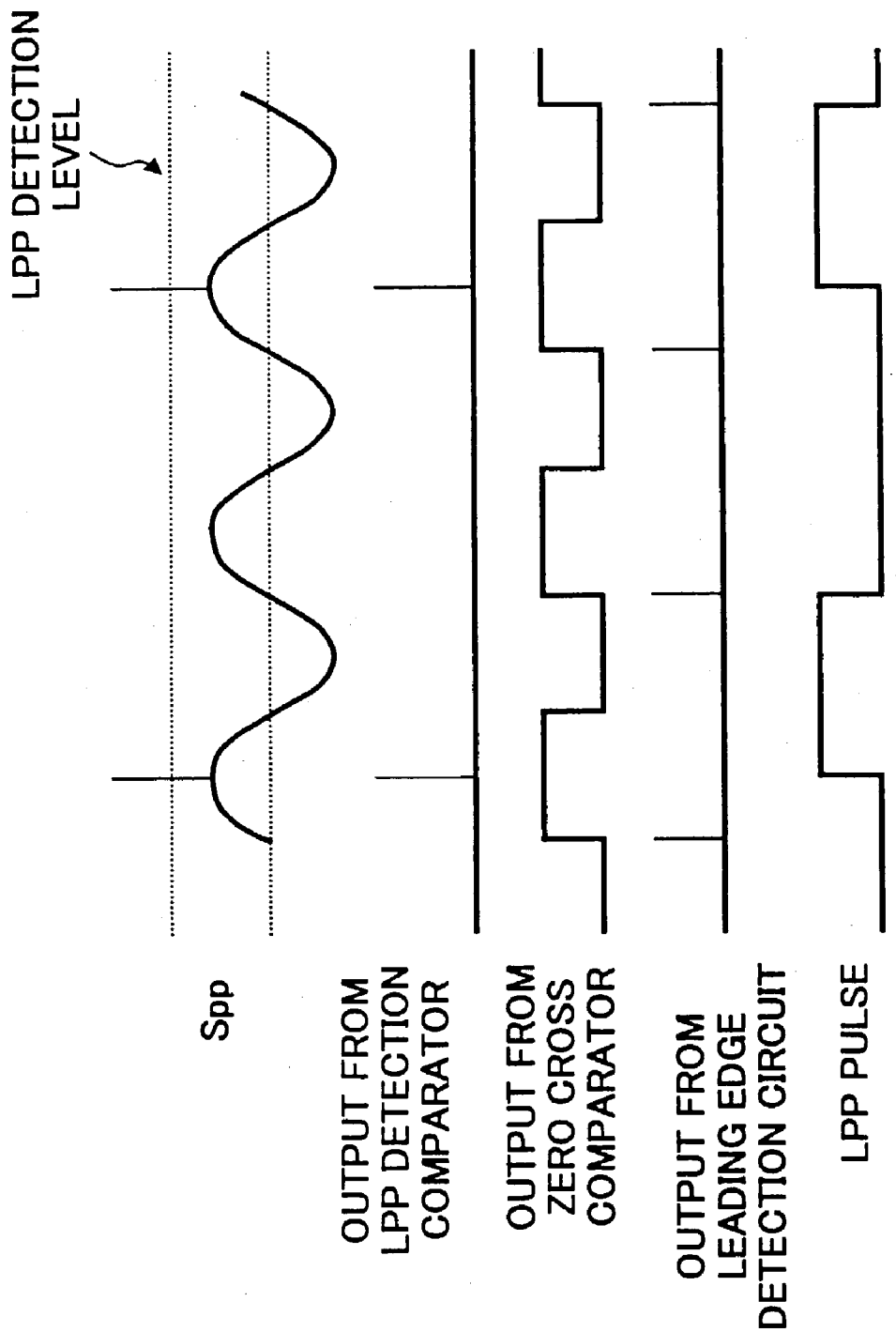
FIG. 8 includes charts illustrating the waveform generated by respective parts of the LPP detector of FIG. 7.

FIG. 7 is a block diagram of the major parts of the LPP detector 31 of FIG. 6, and FIG. 8 includes timing charts illustrating the waveform generated by respective parts of the LPP detector 31 of FIG. 7.

Referring to FIGS. 7 and 8, operation steps in the LPP detector 31 will be detailed.

As shown in FIG. 7, the LPP detector 31 includes an LPP detection comparator 41, zero cross comparator 42, leading edge detection circuit 43, and RS flip-flop 44.

The LPP detector 41 is configured to extract only prepit signals from the input pre-data signals $S_{pp}$ and input to the set terminal S of the RS flip-flop 44.

The zero cross comparator 42 detects zero cross points of the wobbling signals included in the input pre-data signals $S_{pp}$ and transforms the wobbling signals into corresponding square wave forms to subsequently output.

The leading edge detection circuit 43 detects leading edges of input square waves, generates pulses corresponding thereto, to subsequently input to the reset input terminal R of the RS flip-flop 44.

Based on these signals input into the S and R input terminals, the RS flip-flop 44 generates LPP pulses illustrated in FIG. 8, which are subsequently output to the LPP decoder 32 of FIG. 6.

Figure 9:
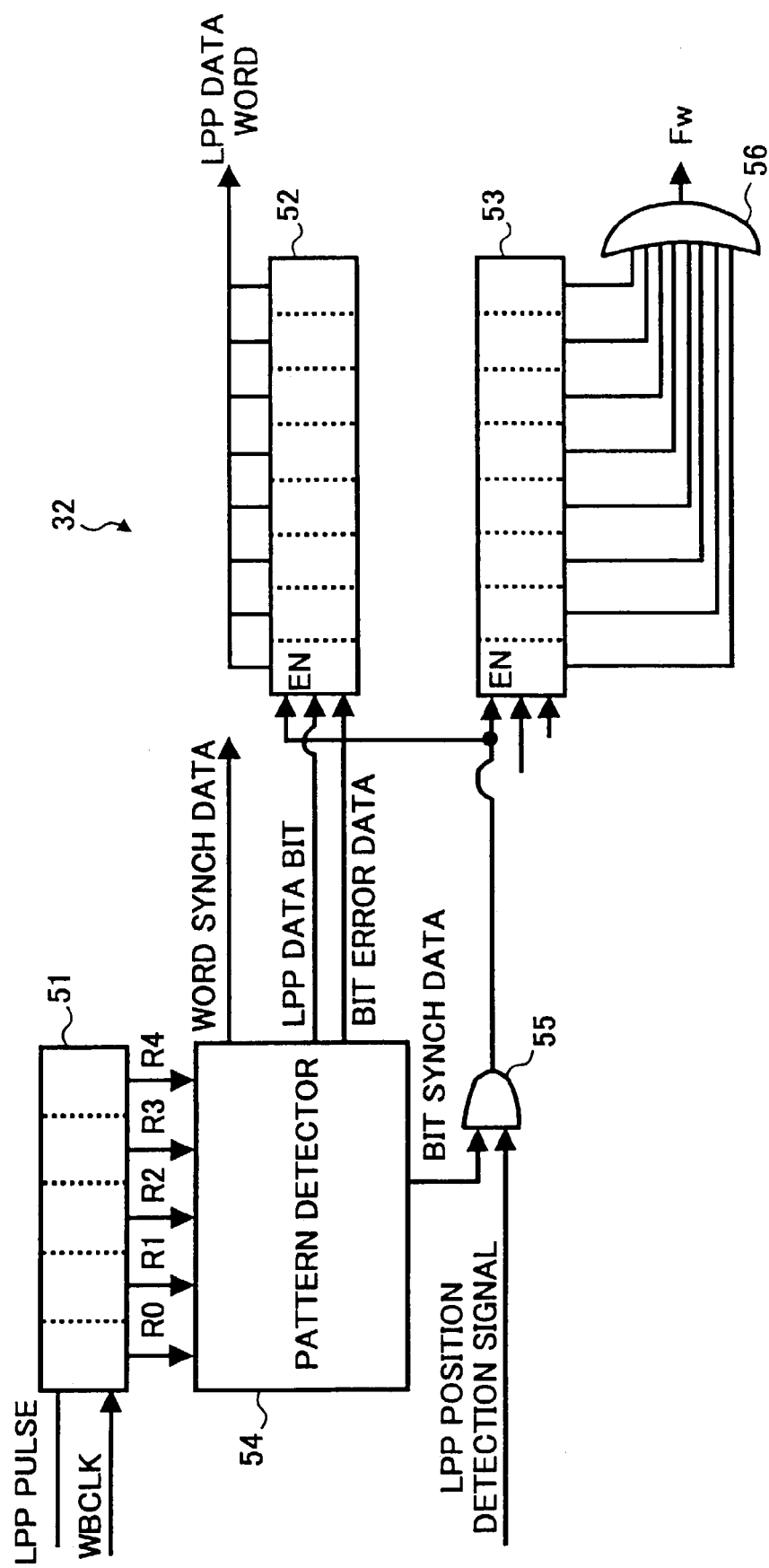
FIG. 9 is a block diagram of the major parts of the LPP decoder of FIG. 6.

FIG. 9 is a block diagram of the major parts of the LPP decoder 32 of FIG. 6.

Referring to FIG. 9, the LPP decoder 32 includes a first shift register 51, second shift register 52, third shift register 53, pattern detector 54, AND circuit 55, and OR circuit 56.

The first shift register 51 stores the data which indicate either presence or absence of the LPP pulses output from the RS flip-flop 44 with respect to the clock signals WBCLK input from the timing signal generation circuit 35 of FIG. 6.

A series of the thus stored data R0~R4 are subsequently output to the pattern detector 54 which, in turn, outputs several data such as a word synch, bit synch, LPP data bit, and bit error such as shown in the table included in FIG. 10.

Incidentally, in the truth-table included in FIG. 10, it is shown that the datum R2 represents the aforementioned prepit signal appeared at b0 position shown in FIG. 3. Similarly, the data R1 and R0 represent the prepit signals at b1 and b2 positions in FIG. 3, respectively.

The pattern detector 54 respectively outputs the word synch data to the timing signal generation circuit 35 of FIG. 6, bit synch data to one of input terminals of the AND circuit 55, LPP data bit to the second shift register 52, and bit error data to the third shift register 53.

To the other input terminal of the AND circuit 55, an LPP detected position signal is input, which is obtained from the word synch after counting for a predetermined period of time and used to specify the position of the bit synch. In addition, it is shown that a 'high' LPP detected position signal corresponds to the bit synch position.

The second and third shift registers 52 and 53 are each provided with enabling capability, and become enabled when 'high' signals are input to respective enabling terminals EN thereof.

To the enabling terminals EN of respective shift registers 52 and 53, signals are output from the AND circuit 55. Therefore, when the bit synch data output from the pattern detector 54 and the LPP detected position signals output from the timing signal generation circuit 35 are both 'high', the second and third shift registers 52 and 53 are both rendered enabled.

The second shift register 52 stores LPP data bits output from the pattern detector 54 on the basis of the timing signals for sampling from the timing signal generation circuit 35.

Since eight bits of the LPP data bit constitute one LPP word, the second shift register 52 operates to output previously stored eight-bits LPP data bits in the form of the LPP word to the LPP error detection and correction circuit 33 of FIG. 6.

The third shift register 53, on the other hand, operates to store bit error data output by the pattern detector 54 according to the sampling timing signals output from the timing signal generation circuit 35 of FIG. 6.

In the third shift register 53, therefore, error bit data are stored so as to correspond to respective LPP data bits stored in the second shift register 52. The stored error bit data are subsequently input to corresponding input terminals of the OR circuit 56.

The OR circuit 56 outputs a 'high' error flag Fw to the LPP error detection and correction circuit 33 of FIG. 6, when a 'high' data is input to at least one of input terminals.

The error flag Fw is thus designed to be indicated when even one bit in error is detected out of eight bits of the LPP data.

The LPP error detection and correction circuit 33 carries out erasure correction with the Reed-Solomon code using the input LPP data words and error flags Fw.

There will be described hereinbelow error correction processing steps with LPP error detection and correction circuit 33. Since the method of the erasure correction with the Reed-Solomon code is well known, the following description will be presented in a rather simple manner.

In the LPP data format for DVD-R system, parity words consisting of three LPP data words are added to address information having three LPP data words.

For the single-error case, in which one error datum is detected in the input six data described above, an assumption is made, in that the error is located at i (i=0, ... ,5) having a pattern ei.

A plurality of syndromes S0~S2 are given by the equations (1) through (3).

$$S0 = ei \tag{1}$$

$$S1 = \alpha^i \cdot ei \tag{2}$$

$$S2 = \alpha^{2i} \cdot ei \tag{3}$$

From (1) and (2) there obtained is the relation $\alpha^i = S1/S0$, then error position information is obtained as $$I = \log_\alpha(S1/S0) \tag{4}$$

The error correction is then carried out using the i and ei values, only when i and ei(=S0) both satisfy the equation (3).

For the two-error data case, or double-error case, the position of the errors at i and j ($0 \leq i \leq j \leq 5$) and their error patterns ei and ej are assumed, respectively. Syndromes S0~S2 are then given by the equations (5) through (7).

$$S0 = ei + ej \tag{5}$$

$$S1 = \alpha^i \cdot ei + \alpha^j \cdot ej \tag{6}$$

$$S2 = \alpha^{2i} \cdot ei + \alpha^{2j} \cdot ej \tag{7}$$

From (5) and (6), the equation (8) is obtained, which leads to (9).

$$\alpha^j \cdot S0 + S1 = (\alpha^i + \alpha^j) \cdot ei \tag{8}$$

$$ei = (\alpha^j \cdot S0 + S1)/(\alpha^i + \alpha^j) \tag{9}$$

In addition, from (5) and (6) the equation (10) is obtained, which leads to (11).

$$\alpha^i \cdot S0 + S1 = (\alpha^i + \alpha^j)^2 \cdot ej \tag{10}$$

$$ei = (\alpha^i \cdot S0 + S1)/(\alpha^i + \alpha^j) \tag{11}$$

On the other hand, since the positions of the errors i and j are known from the error flags Fw, the error correction may then be carried out using the obtained error positions i,j and error patterns ei and ej obtained respectively from (10) and (11).

Incidentally, only when these values, i,j and ei,ej, satisfy the equation (7), the error correction is carried out using the i,j and ei,ej values.

In the case of three-error data, or triple-error, the position of the errors at i, j and k ($0 \leq i < j < k \leq 5$) and their error patterns ei, ej and ek are assumed, respectively. Syndromes S0~S2 are then given by the equations (12) through (14).

$$S0 = ei + ej + ek \tag{12}$$

$$S1 = \alpha^i \cdot ei + \alpha^j \cdot ej + \alpha^k \cdot ek \tag{13}$$

$$S2 = \alpha^{2i} \cdot ei + \alpha^{2j} \cdot ej + \alpha^{2k} \cdot ek \tag{14}$$

There obtained are the equation (15) from (12) and (13), and (16) from (12) and (14), respectively.

$$\alpha^j \cdot S0 + S1 = (\alpha^i + \alpha^j) \cdot ei + (\alpha^j + \alpha^k) \cdot ek \tag{15}$$

$$\alpha^{2j} \cdot S0 + S2 = (\alpha^i + \alpha^j)^2 \cdot ei + (\alpha^j + \alpha^k)^2 \cdot ek \tag{16}$$

By multiplying the equation (15) by $(\alpha^j + \alpha^k)$ and further adding (16), the equation (17) is obtained, which is followed by (18).

$$\alpha^{j+k} \cdot S0 + (\alpha^j + \alpha^k) \cdot S1 + S2 = (\alpha^{2i} + \alpha^{i+j} + \alpha^{j+k} + \alpha^{k+1}) \cdot ei \quad (17)$$

$$ei = \{\alpha^{j+k} \cdot S0 + (\alpha^j + \alpha^k) \cdot S1 + S2\} / (\alpha^{2i} + \alpha^{i+j} + \alpha^{j+k} + \alpha^{k+i}) \quad (18)$$

Similarly, the following equations (19) and (20) are obtained.

$$ej = \{\alpha^{k+i} \cdot S0 + (\alpha^k + \alpha^i) \cdot S1 + S2\} / (\alpha^{2j} + \alpha^{i+j} + \alpha^{j+K} + \alpha^{k+i}) \quad (19)$$

$$ek = \{\alpha^{i+j} \cdot S0 + (\alpha^i + \alpha^j) \cdot S1 + S2\} / (\alpha^{2k} + \alpha^{i+j} + \alpha^{j+k} + \alpha^{k+i}) \quad (20)$$

On the other hand, since the positions of the errors i, j and k are known from the error flags Fw, the error correction may then be carried out using the above obtained error positions i~k and error patterns ei~ek obtained respectively by (18) through (20).

Figure 11:
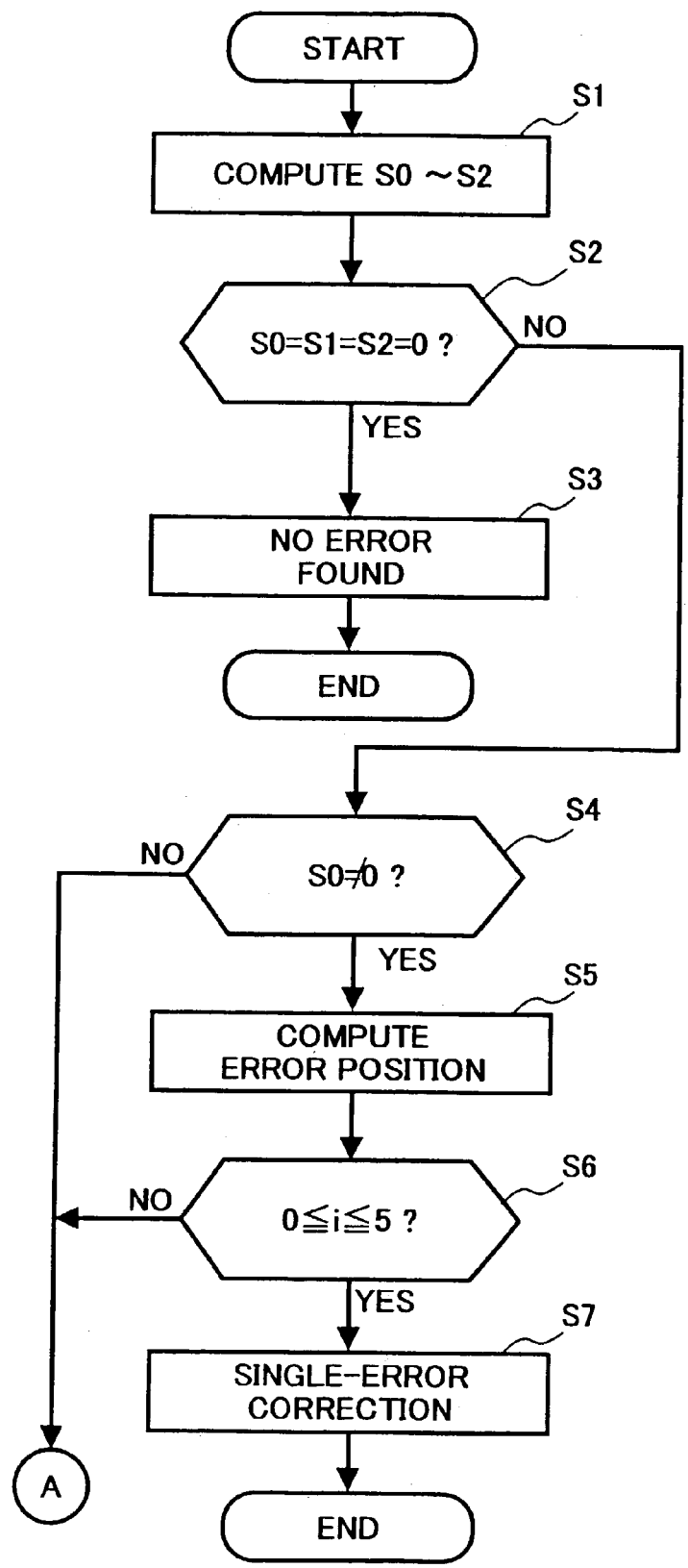
FIGS. 11 and 12 constitutes a flow chart illustrating process steps with an LPP error detection and correction circuit of FIG. 6.
Figure 12:
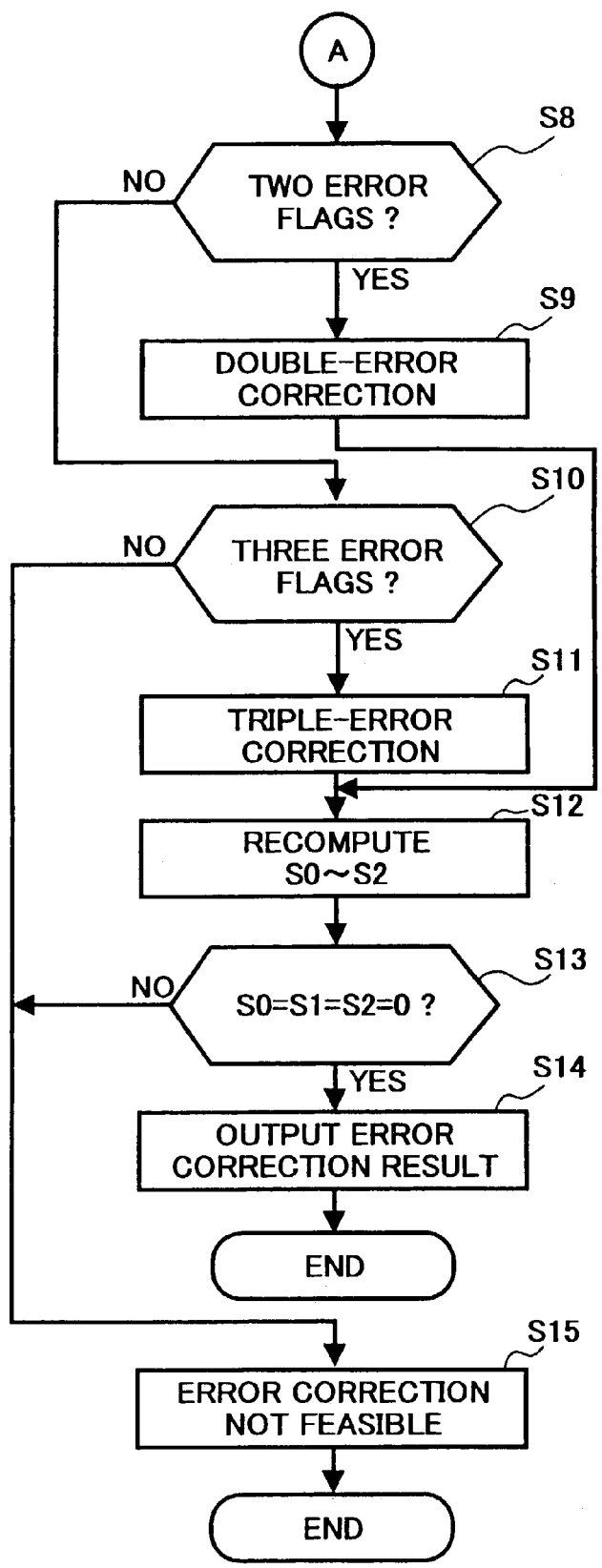

FIGS. 11 and 12 constitute a flow chart illustrating process steps with the LPP error detection and correction circuit 33 of FIG. 6. The process steps included in FIGS. 111 and 12 are carried out with the LPP error detection and correction circuit 33, unless otherwise specified.

First, syndromes S0~S2 are calculated (Step S1). The results thereof are then inquired regarding whether the calculated syndromes S0~S2 are all zero(Step S2). If they are all zero (YES), it is assumed no error is present (Step S3), and then the process ends.

In contrast, if at least one of the syndromes is found non-zero (NO) in Step S2, a further inquiry is made regarding whether the relation S0≠0 is true (Step S4). If the answer is affirmative (YES), the value of the error position i is calculated (Step S5).

Subsequently, the thus obtained i is inquired regarding whether the relation 0≦i≦5 is true (Step S6). If the answer is YES, single-error correction is carried out, the information on the correction is subsequently output, and the process ends.

Although the present embodiment has been detailed so far based on Part A of the LPP format for the DVD-R system, it is noted, in the case of Part B, that an inquiry in Step 6 is made regarding whether the relation 0≦i≦9 is true.

If either the answer in Step 4 is negative (NO) or the relation 0≦i≦5 in Step S6 is not true (NO), a further inquiry is made regarding whether the number of error flag is two (Step 8).

If the number of error flag is found to be two (YES), double-error correction is carried out (Step 9) through the aforementioned erasure correction with the Reed-Solomon code.

Respective syndromes S0~S2 are then calculated again (Step S12) and the results thereof are inquired regarding whether the relation S0=S1=S2=0 is true for the calculated syndromes (Step S13). If the relation is true (YES), the information on the correction is subsequently output (Step S14) and the process ends. In contrast, if at least one of the syndromes S0~S2 is found non-zero (NO), predetermined process steps are carried out (Step 15) under the assumption that error correction is not feasible, then the process ends.

In addition, if the number of error flag Fw found in Step 8 is not two (NO), an inquiry is made regarding whether the number is three (Step S10). If the number of error flag Fw is three (YES), triple-error correction is carried out (Step S11) through the aforementioned erasure correction with the Reed-Solomon code, and the process proceeds to Step S12. In contrast, if the number of error flag Fw found in Step S10 is not three (NO), the process proceeds to Step S15.

In Step S15, there may proceed under the assumption that error correction is not feasible. Alternatively, error positions and error patterns may be obtained according to previous methods. In the latter methods, a set of LPP data bits may tentatively be assigned. If these data bits turn out correct, a result is indicated as 'no error', while the error may possibly be corrected, if the number of the error is found to be one.

As described above, an improvement is therefore achieved in the LPP data processing for the DVD-R system with the record and playback apparatus disclosed herein. Namely, when the error pattern is detected to be other than '1' or '0', which may be caused, for example, by noise, an error may be assumed in an LPP data bit, then proceeds for a predetermined error flag Fw be indicated at the position of the assumed data word.

Since an error position may be detected beforehand by the prepared error flag, erasure correction with the Reed-Solomon codes become feasible. In the above correction process for the LPP data format for DVD-R system, error correction up to three words may be achieved, since a parity word consisting of three LPP data words are added. Therefore, the process disclosed herein may achieve correction of many errors even using fewer added data, thereby offering advantages in increasing efficiency in error correction.

Although the present method is described so far regarding the LPP data format for DVD-R system, the method may also be applied to the ADIP format for the DVD+RW system, which will be detailed herein below as a second embodiment.

Figure 13:
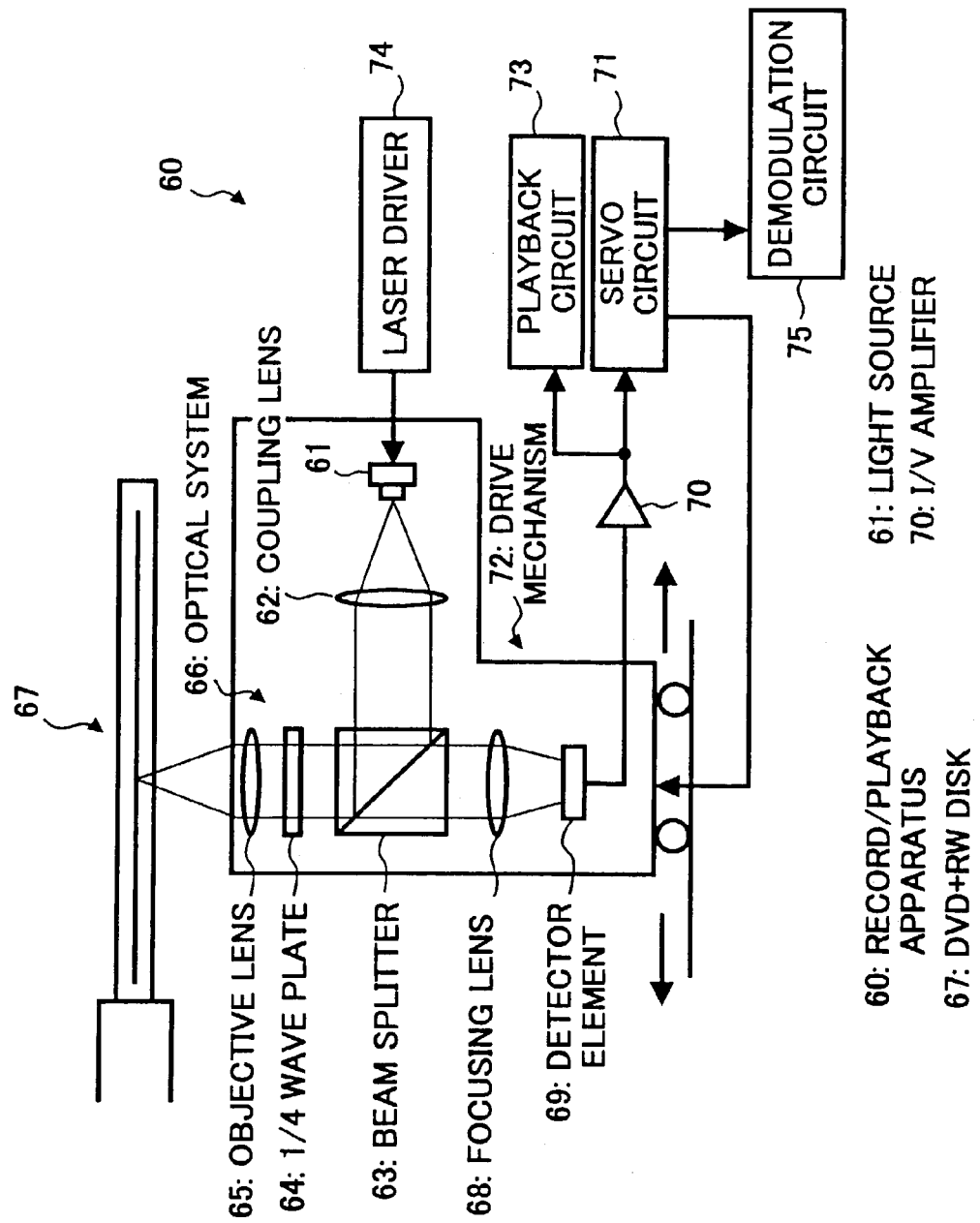
FIG. 13 is a block diagram illustrating an information record and play back apparatus according to another embodiment disclosed herein.

FIG. 13 is a block diagram illustrating an information record and play back apparatus according to the second embodiment disclosed herein.

Referring to FIG. 13, in the information record and playback apparatus 60, light beams are emitted from a light source 61 such as, for example, a semiconductor laser diode, then lead through several units in an optical system 66, such as a coupling lens 62, beam splitter 63, quarter-wave plate 64, and objective lens 65, to be focused on a recording layer 67a of DVD+RW disk 67.

Light beams reflected from the recording layer 67a return to the optical system 66, which are led through beam splitter 63 and collected with a focusing lens 68 on a detector element 69, to subsequently be converted into electrical signals.

Although output signals from the detector element 69 are generally transformed from current to voltage by an current to voltage amplifier 70, to be subjected to processing operations, these signals may also be processed in the output current form.

The detector element 69 and current to voltage amplifier 70 are in general divided respectively into a plurality portions to effect several operations.

That is, using output signals from the plurality of parts in the apparatus, there calculated are focus error signals corresponding to the distance between the disk surface and the focus of the beam spot, tracking error signals corresponding to the deviation of the beam position from the position of the track prefabricated on the disk plane, RF signals for use in detecting the information data recorded on the recording layer 67a in the DVD+RW disk 67, and similar other data.

In the present embodiment illustrated in FIG. 13, the focus error signals and tracking error signals are processed by a servo circuit 71, to subsequently serve to bring the beam spot to the suitable position through driving a mechanical system 72.

In addition, the information data recorded on the recording layer 67a in the DVD+RW disk 67 are processed by a playback circuit 73 to be output as RF signals and subsequently fed to succeeding processing units (not shown).

Incidentally, there also included in FIG. 13 is a laser driver 74 which serves to drive a laser light source 61.

The configuration of phase modulation signals varies in general depending on the form, into which the detector element 69 is divided.

The above configuration may briefly be described herein as that obtained from the playback signals. In addition, one of simple examples of the configuration is that formed from detected push-pull signals as one form of error track signals, which obtained as the signal difference between outputs from two portions of the detector element 69 divided along the line running parallel to the guide track of the disk.

Therefore, the following description will be made on this configuration, assuming that a demodulation circuit 75 is operated on the basis of the push-pull signals output from the servo circuit 71.

The demodulation circuit 75 serves to demodulate wobbling signals WBL provided by way of the servo circuit 71 and output resulting signals.

In addition, in the following description, the structure of the DVD+RW disk 67 will not be described in detail, since it is basically similar to that of FIG. 2 with the exception that none of prepits 4 is provided.

Figure 14:
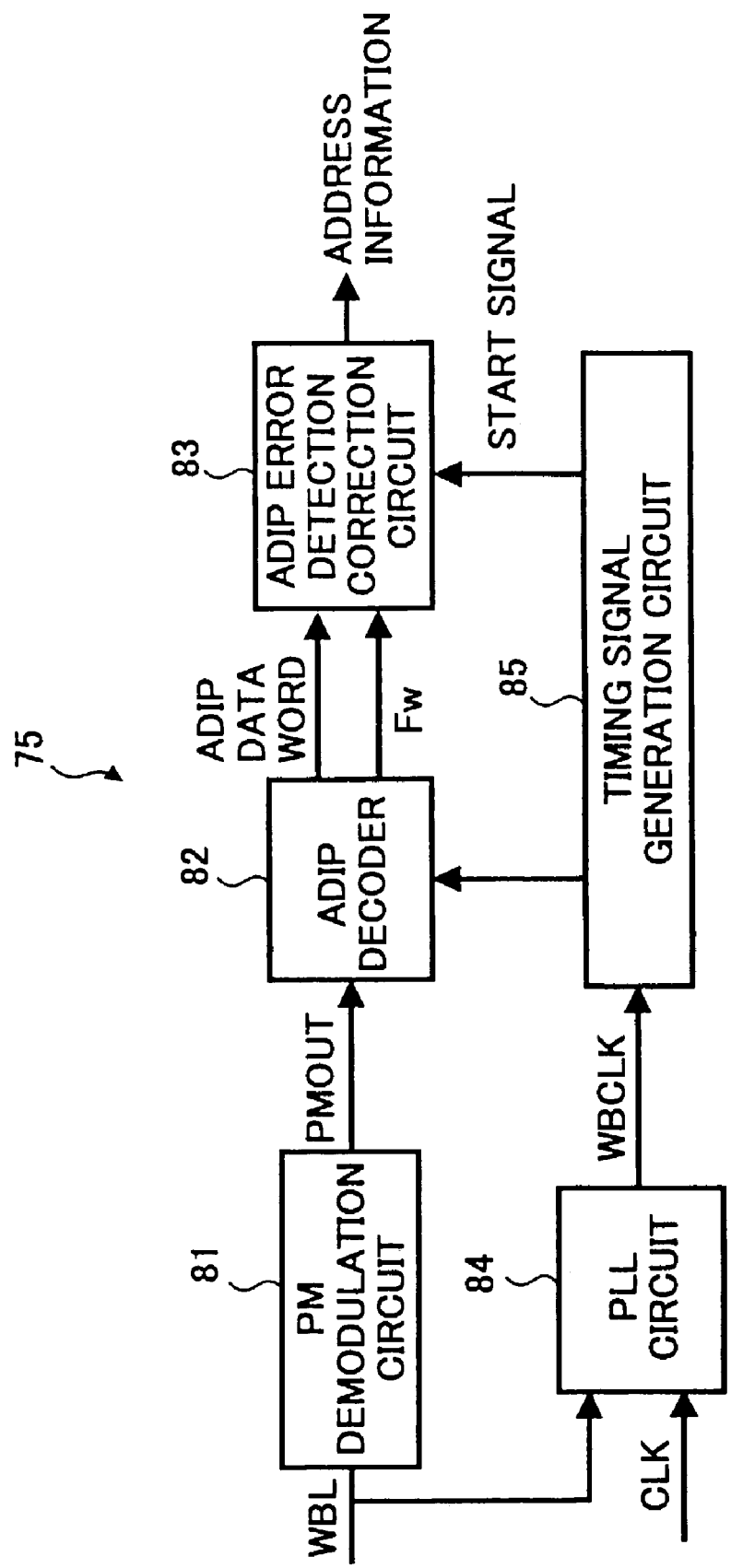
FIG. 14 is a block diagram of the major parts of the demodulation circuit of FIG. 13.

FIG. 14 is a block diagram of the major parts of the demodulation circuit 75 of FIG. 13.

Referring to FIG. 14, the demodulation circuit 75 includes a PM (pulse mode) demodulation circuit 81, ADIP decoder 82, ADIP error detection and correction circuit 83, PLL circuit 84, and timing signal generation circuit 85.

Into the PM demodulation circuit 81 and PLL circuit 84, phase modulation signals, i.e., wobbling signals WBL are input. The PLL circuit 84 is supplied with clock signals CLK from the exterior and serves to extract and subsequently output another set of clock signals WBCLK which are in synchronous with one cycle of the wobbling signal.

On the basis of the input clock signals WBCLK, the timing signal generation circuit 85 generates and subsequently outputs predetermined control signals to be fed to the ADIP decoder 82 and ADIP error detection and correction circuit 83.

The PM demodulation circuit 81 operates to phase-demodulate the input wobbling signals WBL and output phase information PMOUT contained in the wobbling signals WBL.

The ADIP decoder 82 decodes phase information PMOUT output by the LPP detector 81, generates ADIP data bits and error flags F, both of which are to be latched serially with time by a shift register, and outputs ADIP data words and error flags Fw corresponding thereto.

The ADIP error detection and correction circuit 83 carries out erasure correction with the Reed-Solomon code using the ADIP data words and error flags Fw output from LPP decoder 82, and outputs resultant address information and other similar data.

Figure 15:
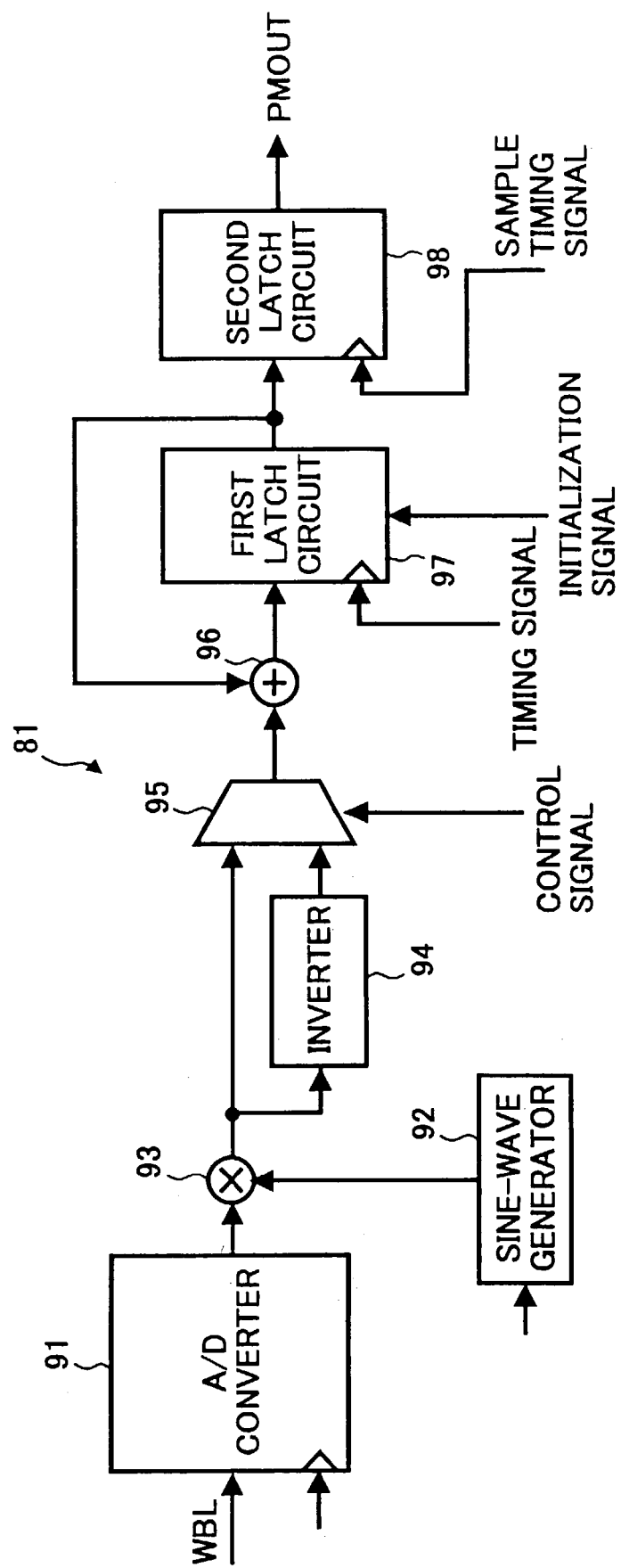
FIG. 15 is a block diagram of the major parts of the PM demodulation circuit of FIG. 14.

FIG. 15 a block diagram of major parts of the PM demodulation circuit 81 of FIG. 14. Also, FIGS. 16A and 16B include timing charts illustrating the waveform generated in respective parts of the PM demodulation circuit 81 of FIG. 15.

Referring to FIGS. 15, 16A and 16B, operation steps in the PM demodulation circuit 81 will be detailed. Incidentally, there are illustrated in FIGS. 16A and 16B, respectively, in the cases where the bit pattern of the ADIP data have the value of '0' and '1'.

Referring again to FIG. 15, the PM demodulation circuit 81 includes an analogue to digital converter 91, sine-wave generator 92, multiplier 93, inverter 94, multiplexer 95, adder 96, first latch circuit 97, and second latch circuit 98.

The analogue to digital converter 91 carries out analogue to digital conversion of the input wobbling signals WBL. The multiplier 93 carries out multiplication of the thus prepared signals by sine-wave output by means of the sine-wave generator 92, and the resultant signals are subsequently output. The output signals from the multiplier 93 are subsequently input to both input terminals of the multiplexer 95; to the first input terminal directly from the multiplier 93 without signal level inversion, and to the second terminal after the signal level being inverted by the inverter 94.

The multiplexer 95 then outputs the signals inputted to either one of the terminals on the basis of control signals inputted from the timing signal generation circuit 85.

The adder 96 serves to add the signals outputted from the multiplexer 95 to those from the first latch circuit 97, and then output resultant signals to the first latch circuit 97.

The first latch circuit 97 latches the signals from the adder 96 on the basis of timing signals from the timing signal generation circuit 85. That is, the adder 96 and first latch circuit 97 constitute an integration circuit.

Voltage obtained through integration with the adder 96 and the first latch circuit 97 is subsequently latched by the second latch circuit 98, to subsequently be output as phase information on the basis of sample timing signals PMOUT outputted from the timing signal generation circuit 85.

Signal waveform is described herein below, which is obtained with the thus prepared circuitry construction. Referring to FIGS. 16A and 16B, the first four (0~3) cycles in the wobbling pattern represent a bit synch pattern, while the next four (4~7) cycles represent an ADIP data bit pattern. In the ADIP data bit pattern, '0011' results in the state of '0' or low, while '1100' results in '1' or high.

In addition, the timing signal generation circuit 85 operates such that a signal inverted by the inverter 94 is output to the multiplexer 95 in the last two wobbles, or only the sixth and seventh wobbling cycles during the last half of the ADIP data bit pattern.

In addition, the timing signal generation circuit 85 outputs an initialization signal for each wobbling cycle to the first latch circuit 97, except during the period of the ADIP data bit pattern, or the second four (4~7) cycles. When the initialization signal is input, the first latch circuit 97 returns its previously latched voltage to the initial value such as 0(zero) volt, for example.

Further, the timing signal generation circuit 85 outputs a predetermined sample timing signal to the second latch circuit 98 at the instance which the ADIP data pattern is completed. The second latch circuit 98, in turn, operates to latch output voltages from the first latch circuit 97.

In the ADIP bit pattern described above, therefore, the pattern '0' corresponds to '0000', while '1' to '1111'. Accordingly, when the ADIP bit pattern result in '0000', the voltage of the phase information output PMOUT from the second latch circuit 98 reaches a maximum value $\alpha$ ($\alpha>0$); while the voltage becomes a minimum value $-\alpha$, when the pattern results in '1111'.

Figure 17:
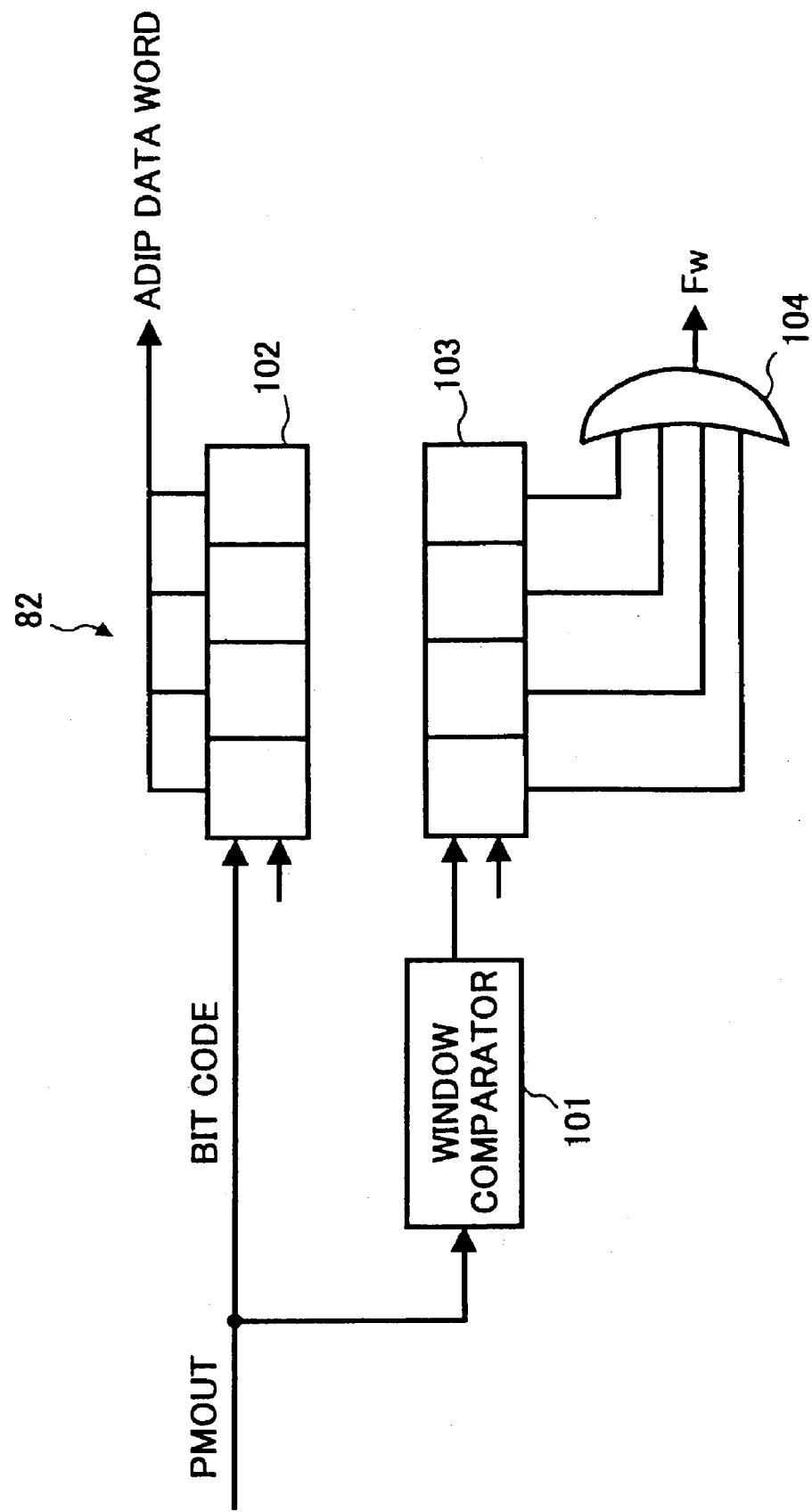
FIG. 17 is a block diagram of the major parts of the ADIP decoder of FIG. 14.

FIG. 17 is a block diagram of the major parts of the ADIP decoder 82 of FIG. 14.

Referring to FIG. 17, the ADIP decoder 82 includes a window comparator 101, first shift register 102, and OR circuit 104.

The first shift register 102 stores sign bits of the phase information PMOUT output from the second latch circuit 98 in the PM demodulation circuit 81 on the basis of sample timing signals output from the timing signal generation circuit 85 of FIG. 14.

The thus stored sign bits form ADIP data bits, and the first shift register 102 outputs a predetermined number of ADIP data bits, as an ADIP data word, to the ADIP error detection and correction circuit 83 of FIG. 14. Incidentally, in the present embodiment, one ADIP data word is consisted of four ADIP data bits.

Being input with the phase information PMOUT outputted from the second latch circuit 98 in the PM demodulation circuit 8,1, the window comparator 101 becomes 'high', when $-\alpha<\text{PMOUT}<\alpha$; while it is 'low', otherwise. However, when an ADIP bit pattern is found in the form other than either '0011' or '1100', which may be caused by noise, for example, the sign of phase information PMOUT may assume either positive or negative, having a value different from ordinary values.

For example, when a 'low' ADIP bit pattern is resulted not from '0011' but '1011', voltage of the phase information PMOUT output from the second latch circuit 98 is smaller than the aforementioned maximum value $\alpha$, since the ADIP bit pattern input to the adder 96 becomes '1000'.

In contrast, when a 'high' ADIP bit pattern is resulted not from '1100' but '1110', the voltage of the phase information PMOUT output from the second latch circuit 98 is larger than the minimum value $-\alpha$, since the ADIP bit pattern input to the adder 96 becomes '1110'.

The window comparator 101 is therefore capable of deciding, from the voltage of the input phase information PMOUT, whether an ADIP bit pattern is ordinary. The window comparator 101 then outputs a low level signal when the pattern is normal; while a high level signal, otherwise.

The second shift register 103 stores the results of comparison output from the window comparator 101 on the basis of the sample timing signals output from the timing signal generation circuit 85.

A plurality of data stored in the second shift register 103 are input respectively to corresponding input terminals of the OR circuit 104. The OR circuit 104, in turn, outputs a 'high' error flag Fw to the ADIP error detection and correction circuit 83 of FIG. 14, when a 'high' data is input to at least one of the input terminals.

The error flag Fw for the ADIP data bit is thus designed to be indicated when even one bit in error is detected out of four bits of the ADIP data.

The ADIP error detection and correction circuit 83 carries out erasure correction with the Reed-Solomon code using inputted ADIP data words and error flags Fw.

There will be described herein below error correction processing steps with ADIP error detection and correction circuit 83. Since the method of the erasure correction with the Reed-Solomon code is well known, the following description will be presented in a rather simple manner.

In the LPP data format for DVD+RW system, a parity word consisting of five ADIP data words may be added to address and MUX information having eight ADIP data words.

In the case of single-error where one error datum is detected among thirteen inputted data, an assumption is made, in that the error is located at i (i=0, . . . , 12) having a pattern ei.

A plurality of syndromes S0~S4 are given by the equations (21) through (25).

$$S0=ei \tag{21}$$

$$S1=\alpha^i \cdot ei \tag{22}$$

$$S2=\alpha^{2i} \cdot ei \tag{23}$$

$$S3=\alpha^{3i} \cdot ei \tag{24}$$

$$S4=\alpha^{4i} \cdot ei \tag{25}$$

Utilizing these syndromes S0~S4, the values A, B and C are obtained from the relations (26) through (28).

$$A=(S0 \cdot S2+S1 \cdot S1) \tag{26}$$

$$B=(S1 \cdot S2+S0 \cdot S3) \tag{27}$$

$$C=(S1 \cdot S3+S2 \cdot S2) \tag{28}$$

For the single-error case, there is obtained as A=B=C=0.
From the above equations (21) and (22), there obtained is the relation $$\alpha^i=S1/S0 \tag{29},$$

and error information is obtained as $$i=\log_\alpha(S1/S0) \tag{30}.$$

The error correction is then carried out using the thus obtained i and ei, only when i and ei(=S0) both satisfy the equations (23) through (25).

In the case of two-error data, or double-error the position of the errors at i and j ($0 \leq i < j \leq 12$) and their error patterns ei and ej are assumed, respectively. Syndromes S0~S4 are then given by the equations (31) through (35).

$$S0=ei+ej \tag{31}$$

$$S1=\alpha^i \cdot ei+\alpha^j \cdot ej \tag{32}$$

$$S2=\alpha^{2i} \cdot ei+\alpha^{2j} \cdot ej \tag{33}$$

$$S3=\alpha^{3i} \cdot ei+\alpha^{3j} \cdot ej \tag{34}$$

$$S4=\alpha^{4i} \cdot ei+\alpha^{4j} \cdot ej \tag{35}$$

From equations (26) through (28) and (31) through (34), the following equations (36) and (38) are obtained.

$$A=(\alpha^{2i}+\alpha^{2j})ej \cdot ej \tag{36}$$

$$B=(\alpha^i+\alpha^j)(\alpha^{2i}+\alpha^{2j})ej \cdot ej \tag{37}$$

$$C=(\alpha^i \cdot \alpha^j)(\alpha^{2i}+\alpha^{2j})ej \cdot ej \tag{38}$$

There assumed the following relations, $$D=B/A=\alpha^i+\alpha^j \tag{39}$$

$$E=C/A=\alpha^i \cdot \alpha^j \tag{40},$$

further assuming (j−i)=a, or j=i+a, the above equations (39) and (40) are obtained as follows, where 'a' is the difference in the error positions between i and j, and where a>0.

$$D=\alpha^i(1+\alpha^a) \tag{41}$$

$$E=\alpha^{2i+a} \tag{42}$$

Also assuming $$F=D^2/E=\alpha^{-a}+\alpha^a \tag{43},$$

since A, B and C are known, and D and E are therefore also known, this leads to F known. Accordingly, $\alpha^a$ may be determined from (43), where $1 \leq a \leq 12$.

In addition, assuming $$X = f(F) = 1 + \alpha^a \quad \text{for} \quad 1 \leq a \leq 12$$
$$= 0 \quad \text{for} \quad a = 0 \text{ or } a > 12, \text{ and}$$

$$Y = F + X = 1 + \alpha^{-a},$$

the following relations are obtained as $$D/X = \alpha^i, \text{ and}$$

$$D/Y = \alpha^j.$$

Therefore, the error positions i and j are obtained from (44) and (45).

$$i = \log_\alpha(D/X) \tag{44}$$

$$j = \log_\alpha(D/Y) \tag{45}$$

Further, error patterns ei and ej are also obtained as (46) and (47) from (31) and (32), respectively.

$$ei = S0/Y + S2/D \tag{46}$$

$$ej = S0/X + S1/D \tag{47}$$

The error correction is then carried out using the thus obtained i, j, ei and ej, only when i, j, ei and ej satisfy the equations (33), (34) and (35).

In the case of three-error data, or triple-error, the position of the errors at i, j and k ($0 \leq i < j < k \leq 12$) and their error patterns ei, ej and ek are assumed, respectively. Syndromes S0~S4 are then given by the equations (48) through (52).

$$S0 = ei + ej + ek \tag{48}$$

$$S1 = \alpha^i \cdot ei + \alpha^j \cdot ej + \alpha^k \cdot ek \tag{49}$$

$$S2 = \alpha^{2i} \cdot ei + \alpha^{2j} \cdot ej + \alpha^{2k} \cdot ek \tag{50}$$

$$S3 = \alpha^{3i} \cdot ei + \alpha^{3j} \cdot ej + \alpha^{3k} \cdot ek \tag{51}$$

$$S4 = \alpha^{4i} \cdot ei + \alpha^{4j} \cdot ej + \alpha^{4k} \cdot ek \tag{52}$$

The relation (53) is then obtained from (48) and (49).

$$\alpha^j \cdot S0 + S1 = (\alpha^i + \alpha^j) \cdot ei + (\alpha^j + \alpha^k) \cdot ek \tag{53}$$

Also obtained is (54) from (48) and (50).

$$\alpha^{2j} \cdot S0 + S2 = (\alpha^i + \alpha^j)^2 \cdot ei + (\alpha^j + \alpha^k)^2 \cdot ek \tag{54}$$

By multiplying the equation (53) by $(\alpha^j + \alpha^k)$ and further adding (54), the equation (55) is obtained, which is followed by (56).

$$\alpha^{j+k} \cdot S0 + (\alpha^j + \alpha^k) \cdot S1 + S2 = (\alpha^{2i} + \alpha^{i+j} + \alpha^{j+k} + \alpha^{k+i}) \tag{55}$$

$$ei = \{\alpha^{j+k} \cdot S0 + (\alpha^j + \alpha^k) \cdot S1 + S2\}/(\alpha^{2i} + \alpha^{i+j} + \alpha^{j+k} + \alpha^{k+i}) \tag{56}$$

Similarly, the following equations (57) and (58) are obtained.

$$ej = \{\alpha^{k+1} \cdot S0 + (\alpha^k + \alpha^1) \cdot S1 + S2\}/(\alpha^{2i} + \alpha^{i+j} + \alpha^{j+k} + \alpha^{k+i}) \tag{57}$$

$$ek = \{\alpha^{i+j} \cdot S0 + (\alpha^i + \alpha^j) \cdot S1 + S2\}/(\alpha^{2k} + \alpha^{i+j} + \alpha^{j+k} + \alpha^{k+i}) \tag{58}$$

On the other hand, since the positions of the errors i, j and k are known from the error flags Fw, the error correction may be carried out using the error positions i~k and error patterns ei~ek obtained respectively by (56) through (58), only when the thus obtained i~k and ei~ek satisfy the equations (51) and (52).

In the case of four-error data, or quadruple-error, the position of the errors at i, j, k and m ($0 \leq i < j < k < m \leq 12$) and error patterns ei, ej, ek and em, are assumed, respectively. Syndromes S0~S4 are then given by the equations (59) through (63).

$$S0 = ei + ej + ek + em \tag{59}$$

$$S1 = \alpha^i \cdot ei + \alpha^j \cdot ej + \alpha^k \cdot ek + \alpha^m \cdot km \tag{60}$$

$$S2 = \alpha^{2i} \cdot ei + \alpha^{2j} \cdot ej + \alpha^{2k} \cdot ek + \alpha^{2m} \cdot em \tag{61}$$

$$S3 = \alpha^{3i} \cdot ei + \alpha^{3j} \cdot ej + \alpha^{3k} \cdot ek + \alpha^{3m} \cdot em \tag{62}$$

$$S4 = \alpha^{4i} \cdot ei + \alpha^{4j} \cdot ej + \alpha^{4k} \cdot ek + \alpha^{4m} \cdot em \tag{63}$$

The relation (64) is then obtained from (59) and (60).

$$\alpha^m \cdot S0 + S1 = (\alpha^m + \alpha^i) \cdot ei + (\alpha^j + \alpha^m) \cdot ej + (\alpha^k + \alpha^m) \cdot ek \tag{64}$$

There also obtained is (65), from (59) and (61).

$$\alpha^{2m} \cdot S0 + S2 = (\alpha^m + \alpha^i)^2 \cdot ei + (\alpha^j + \alpha^m)^2 \cdot ej + (\alpha^k + \alpha^m)^2 \cdot ek \tag{65}$$

Further obtained is (66), from (59) and (62).

$$\alpha^{3m} \cdot S0 + S3 = (\alpha^m + \alpha^i)(\alpha^{2m} + \alpha^{m+1} + \alpha^{2i}) \cdot ei + (\alpha^j + \alpha^m)(\alpha^{2j} + \alpha^{j+m} + \alpha^{2m}) \cdot ej + (\alpha^k + \alpha^m)(\alpha^{2k} + \alpha^{k+m} + \alpha^{2m}) \cdot ek \tag{66}$$

By multiplying the equation (64) by $(a^k + a^m)$ and further adding (65), the equation (67) is obtained.

$$\alpha^{k+m} \cdot S0 + (\alpha^k + \alpha^m) \cdot S1 + S2 = (\alpha^m + \alpha^i)(\alpha^i + \alpha^k) \cdot ei + (\alpha^j + \alpha^m)(\alpha^j + \alpha^k) \cdot ej \tag{67}$$

By also multiplying the equation (64) by $(\alpha^{2k} + \alpha^{k+m} + \alpha^{2m})$ and further adding (66), the equation (68) is obtained.

$$a^{k+m}(a^k + a^m) \cdot S0 + (\alpha^{2k} + a^{k+m} + a^{2m}) \cdot S1 + S3 = \tag{68}$$
$$(a^k + a^i)(a^i + a^k)(a^i + a^k + a^m) \cdot ei +$$
$$(a^j + a^m)(a^j + a^k)(a^j + a^k + a^m) \cdot ej$$

By multiplying the equation (67) by $(\alpha^j + \alpha^k + \alpha^m)$ and further adding (68), the equation (69) is obtained, which is followed by (70).

$$\alpha^{j+k+m} \cdot S0 + (\alpha^{j+k} + \alpha^{k+m} + \alpha^{m+j}) \cdot S1 + (\alpha^j + \alpha^k + \alpha^m) \cdot S2 + S3 = (\alpha^{j+k+m} + \alpha^{i+j+k} + \alpha^{i+k+m} + \alpha^{i+m+j} + \alpha^{2i+j} + \alpha^{2i+k} + \alpha^{2i+m} + \alpha^{3i}) \cdot ei \tag{69}$$

$$ei = \{\alpha^{j+k+m} \cdot S0 + (\alpha^{j+k} + \alpha^{k+m} + \alpha^{m+j}) \cdot S1 + (\alpha^j + \alpha^k + \alpha^m) \cdot S2 + S3\}/(\alpha^{j+k+m} + \alpha^{i+j+k} + \alpha^{i+k+m} + \alpha^{i+m+j} + \alpha^{2i+j} + \alpha^{2i+k} + \alpha^{2i+m} + \alpha^{3i}) \tag{70}$$

Similarly, the following equations (71), (72) and (73) are obtained.

$$ej = \{\alpha^{k+m+i} \cdot S0 + (\alpha^{k+m} + \alpha^{m+l} + \alpha^{i+k}) \cdot S1 + (\alpha^k + \alpha^m + \alpha^i) \cdot S2 + S3\}/(\alpha^{k+m+i} + \alpha^{j+k+m} + \alpha^{j+m+l} + \alpha^{j+i+k} + \alpha^{2j+k} + \alpha^{2j+m} + \alpha^{2j+l} + \alpha^{3j}) \tag{71}$$

$$ek = \{\alpha^{m+i+j} S0 + (\alpha^{m+i} + \alpha^{i+j} + \alpha^{j+m}) \cdot S1 + (\alpha^m + \alpha^i + \alpha^j) \cdot S2 + S3\}/(\alpha^{m+i+j} + \alpha^{k+m+j} + \alpha^{k+i+j} + \alpha^{k+j+m} + \alpha^{2k+m} + \alpha^{2k+l} + \alpha^{2k+j} + \alpha^{3k}) \tag{72}$$

$$em = \{\alpha^{i+j+k} \cdot S0 + (\alpha^{i+j} + \alpha^{j+k} + \alpha^{k+i}) \cdot S1 + (\alpha^i + \alpha^j + \alpha^k) \cdot S2 + S3\}/(\alpha^{i+j+k} + \alpha^{m+i+j} + \alpha^{m+j+k} + \alpha^{m+k+i} + \alpha^{2m+i} + \alpha^{2m+j} + \alpha^{2m+j} + \alpha^{3m}) \tag{73}$$

On the other hand, since the positions of the errors i, j, k and m are known from the error flags Fw, the error correction may then be carried out using the error positions i~m and error patterns ei~em obtained respectively by (70) through (73).

Incidentally, only when the values, i~m and ei~em satisfy the equation (63), the error correction is carried out utilizing these i~m and ei~em values.

In addition, a further description is herein alleviated regarding the cases with five or more errors, since error correction process steps may be carried out in a similar manner to those indicated herein above.

Figure 18:
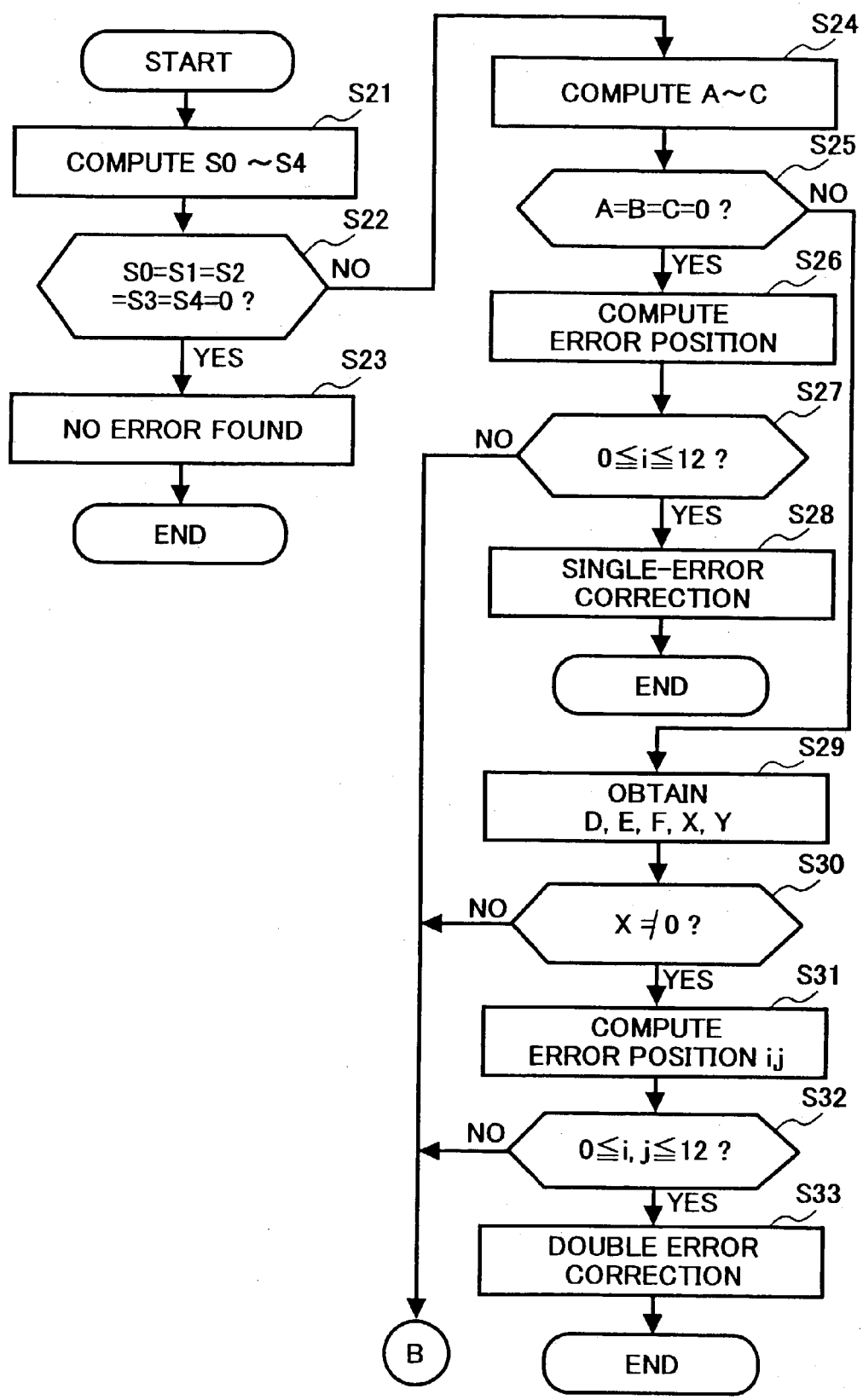
FIGS. 18 and 19 a flow chart illustrating process steps with an ADIP error detection and correction circuit of FIG. 14.
Figure 19:
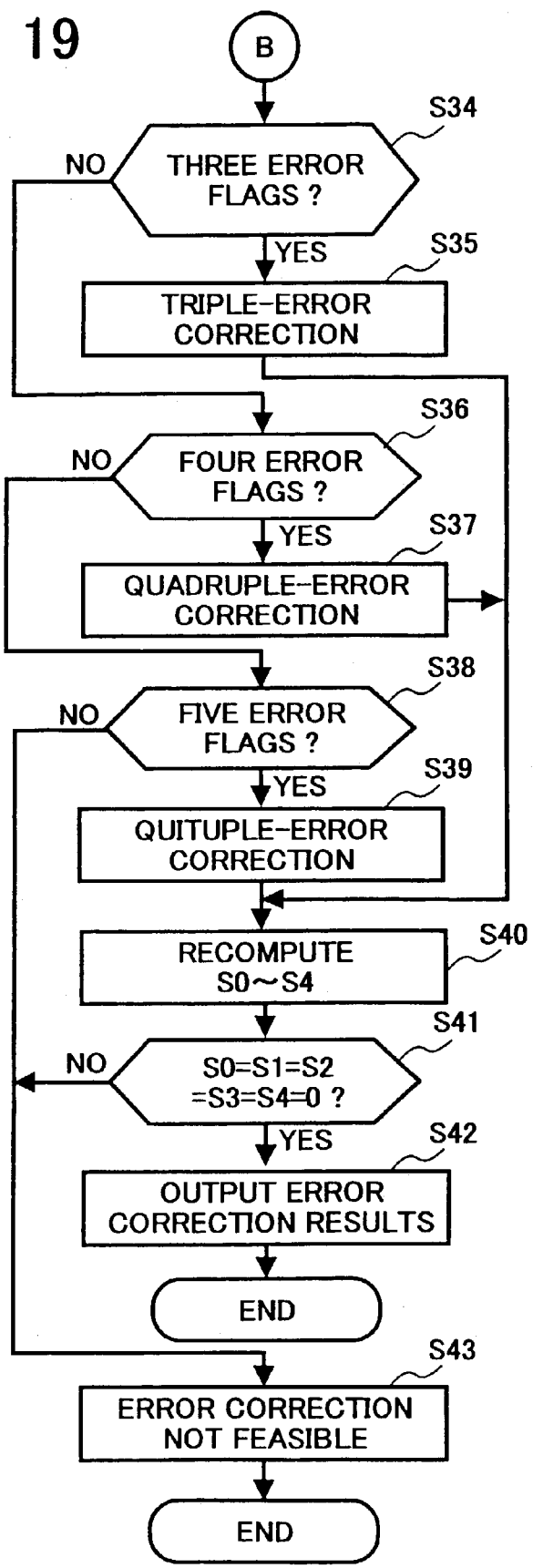

FIGS. 18 and 19 constitute a flow chart illustrating process steps with the ADIP error detection and correction circuit 83 disclosed herein. The process steps included in FIGS. 18 and 19 are carried out with the above circuit 83, unless otherwise specified.

First, syndromes S0~S4 are calculated (Step S21). The results thereof are then inquired regarding whether the calculated syndromes S0~S4 are all zero (Step S22). If they are all zero (YES), it is assumed no error is present (Step S23), and then the process ends.

In contrast, if at least one of the S0~S4 syndromes is found non-zero (NO) in Step S22, the values A, B and C are computed (Step S24).

Subsequently, an inquiry is made whether the thus obtained A, B and C are all zero (Step S25). If A=B=C=0 (YES), an error position i is obtained (Step S26) and inquired regarding whether the relation $0 \leq i \leq 12$ is true (Step S27). If $0 \leq i \leq 12$ (YES), single-error correction is carried out, the information on the correction is subsequently output (Step S28), and the process ends.

In contrast, if at least one among A, B and C is found non-zero (NO), the values of the aforementioned D, E, F, X=f(F) and Y=F+X are respectively computed (Step S29).

Subsequently, the thus obtained X is inquired regarding whether X·0(Step S30). If X≠0 (YES), error positions i and j are obtained (Step S31). Further, another inquiry is made regarding whether $0 \leq i$, $j \leq 12$ (Step S32). If $0 \leq i$, $j \leq 12$ (YES), double-error correction is carried out, the information on the correction is subsequently output (Step S33), and the process ends.

In contrast, in the cases where the relation $0 \leq i \leq 12$ is not true (NO) in Step S27, X≠0 is not true (NO) in Step S30, or $0 \leq i$, $j \leq 12$ is not true (NO) in Step S32, the process steps proceed to FIG. 19 and an inquiry is made regarding whether the number of error flag is three (Step S34).

If the number of error flag is found to be three (YES), triple-error correction is carried out through the erasure correction with the Reed-Solomon code (Step S35).

Subsequently, respective syndromes S0~S4 are calculated again (Step S40) and the results thereof are inquired regarding whether the relation S0=S1=S3=S4=0 is true for the calculated syndromes (Step S41). If this relation is true (YES), the information on the correction is output (Step S42) and the process ends. In contrast, if at least one of the syndromes S0~S4 is found non-zero (NO), predetermined process steps are carried out under the assumption that error correction is not feasible (Step 43), then the process ends.

In addition, if the number of error flag Fw found in Step 34 is not four (NO), an inquiry is made regarding whether the number is four (Step S36). If the number of error flag Fw is four (YES), quadruple-error correction is carried out through the aforementioned erasure correction with the Reed-Solomon code (Step S37), and the process proceeds to Step S40.

Also, if the number of error flag Fw found in Step 36 is not four (NO), an inquiry is made regarding whether the number is five (Step S38). If the number of error flag Fw is five (YES), quintuple-error correction is carried out (Step S39) through the aforementioned erasure correction with the Reed-Solomon code, and the process proceeds to Step S40. In contrast, if the number of error flag Fw found in Step S38 is not five (NO), the process proceeds to Step S43.

In Step S43, there may proceed under the assumption that error correction is not feasible. Alternatively, error positions and error patterns may be obtained according to previous methods. In the latter methods, a set of ADIP data bits may tentatively be assigned. If these data bits turn out correct, a result is indicated as 'no error', while the error may possibly be corrected, if the number of the error is found either one or two.

As described above, an improvement is thus made in the present disclosure regarding to the ADIP format for the DVD+RW playback system.

Namely, data processing for the ADIP data bit pattern may be carried out as follows: This proceeds such that the integration value of the data bit pattern reaches a maximum value when the data bit pattern is '1', while the integration value reaches a minimum value when the pattern is '0'. In contrast, when the integration value is between the maximum and minimum values, an error may be assumed in an ADIP data bit, then proceeds for a predetermined error flag Fw be indicated at the position of the ADIP data word having the assumed data bit.

Since an error position may be detected beforehand by the thus prepared error flag, erasure correction with the Reed-Solomon code becomes feasible. In the above correction process for the ADIP data format for DVD+RW system, error correction up to five words may be achieved, since a parity word consisting of five ADIP data words is added. Therefore, the process disclosed herein may achieve correction of an increased number of errors even using fewer added data, thereby offering advantages in increasing efficiency in error correction.

It is apparent from the above description including the examples, error correction of a number of errors becomes feasible even using fewer added data using the demodulation circuit included in the record and playback apparatus disclosed herein.

Namely, the demodulation circuit operates for a predetermined error flag be indicated at the position of the assumed LPP data bit for the DVD-R system, when the error pattern is detected to be other than '1' or '0', that may be caused, for example, by noise. Erasure correction with the Reed-Solomon code therefore becomes feasible using the error flag.

Alternatively, in the ADIP format for the DVD+RW system, the integration value of the data bit pattern reaches either maximum or minimum value, a predetermined error flag may be indicated at the position of an assumed data bit, to be followed by erasure correction using the error flag.

In addition, if the number of error flags exceed a predetermined number, the data error correction unit operates to carry out the correction of error data bits using only data bits demodulated by the data demodulation unit.

Therefore, the information record and playback apparatus disclosed herein can offer advantages such as in increasing efficiency in the error correction, among others, over previously known systems.

Additional modifications and variations of the present invention are possible in light of the above teachings. It is therefore to be understood that within the scope of the appended claims, the invention may be practiced other than as specifically described herein.

This document claims priority and contains subject matter related to Japanese Patent Application No. 11-352883, filed with the Japanese Patent Office on Dec. 13, 1999, the entire contents of which are hereby incorporated by reference.

What is claimed as new and desired to be secured by Letters Patent of the United States is:

1. A DVD-R system comprising
   a record and playback apparatus, said record and playback apparatus including
   a CPU and
   a demodulation circuit,
   wherein said CPU controls said demodulation circuit and operations of said record and playback apparatus including at least one of a recording operation and a playback operation of a DVD-R disk provided with data recording tracks having a surface wobbled at a predetermined frequency and a plurality of prepits formed on said surface with a predetermined phase relation to a position for data recording, said operations further including detecting said prepits when said record and playback apparatus performs said at least one of a recording operation and a playback operation, and generating and outputting prepit signals in response to detecting said prepits, decoding said prepit signals and extracting decoded information data therefrom, receiving said decoded information data and comparing a pattern of said information data to a pattern of predetermined data and outputting said decoded information data with a predetermined error flag if said patterns are not in coincidence with each other, and receiving said error flag and computing a position of an error on a basis of said error flag and providing error correction to said decoded information data.

2. A DVD+RW system comprising
a record and playback apparatus, said record and playback apparatus including
a CPU, and
a demodulation circuit,
wherein said CPU controls said demodulation circuit and operations of said record and playback apparatus including at least one of a recording operation and a playback operation of a DVD+RW disk provided with data recording tracks having a surface wobbled at a predetermined frequency and a plurality of prepits formed on said surface with a predetermined phase relation to a position for data recording, said operations further including detecting said prepits when performing said at least one of a recording operation and a playback operation, and generating and outputting prepit signals in response to detecting said prepits, decoding said prepit signals and extracting decoded information data therefrom, receiving said decoded information data and comparing a pattern of said information data to a pattern of predetermined data and outputting said decoded information data with a predetermined error flag if said patterns are not in coincidence with each other, and receiving said error flag and computing a position of an error on a basis of said error flag and providing error correction to said decoded information data.

3. A method for carrying out at least one of a recording operation and a playback operation of a DVD-R disc, said method comprising:

detecting prepits on a surface of data recording tracks of the DVD-R disc when performing said at least one of a recording operation and a playback operation, and generating and outputting prepit signals in response to detecting said prepits;

decoding said prepit signals and extracting decoded information data therefrom;

receiving said decoded information data and comparing a pattern of said information data to a pattern of predetermined data and outputting said decoded information data with a predetermined error flag if said patterns are not in coincidence with each other; and receiving said error flag and computing a position of an error on a basis of said error flag and providing error correction to said decoded information data, wherein said method is performed in a DVD-R system.

4. The method of claim 3, further comprising carrying out erasure correction with a Reed-Solomon code prior to error correction of said decoded information data.

5. The method of claim 3, further comprising carrying out a detection of a position of error data bits using only demodulated data bits if a number of error flags exceeds a predetermined number.

6. The method of claim 3, wherein said DVD-R disc is provided with data recording tracks having a surface wobbled so as to be capable of indicating information data by phase inversion.

7. The method of claim 6, wherein said phase inversion is performed according to a dual phase modulation technique including detecting wobbling components previously recorded on said data recording tracks and generating wobbling signals;

phase-demodulating said wobbling signals and extracting decoded information data;

integrating said decoded information data for each pattern thereof, comparing a data pattern of said decoded information data with a predetermined value to obtain a comparison result, detecting an error for said data pattern on a basis of said comparison result, and outputting said data pattern added with a predetermined error flag; and computing a position of said error on a basis of said error flag and providing error correction to said decoded information data.

8. The method of claim 7, wherein said dual phase modulation method further comprises:

carrying out inversion processing to said decoded information data, when said decoded information data form a predetermined data pattern, such that an integration value of said data pattern reaches one of a maximum value and a minimum value, and outputting said data pattern added with a predetermined error flag, if a resultant integration value of said data pattern is obtained between said maximum and minimum values.

9. A method for carrying out at least one of a recording operation and a playback operation of a DVD+RW disc, said method comprising:

detecting prepits on a surface of data recording tracks of the DVD+RW disc when performing said at least one of a recording operation and a playback operation, and generating and outputting prepit signals in response to detecting said prepits;

decoding said prepit signals and extracting decoded information data therefrom;

receiving said decoded information data and comparing pattern of said information data to a pattern of predetermined data and outputting said decoded information data with a predetermined error flag if said patterns are not in coincidence with each other; and receiving said error flag and computing a position of an error on a basis of said error flag and providing error correction to said decoded information data, wherein said method is performed in a DVD+RW system.

* * * * *